United States Patent
Zhao et al.

(10) Patent No.: US 12,439,248 B2
(45) Date of Patent: Oct. 7, 2025

(54) AUTHENTICATION RESULT UPDATE METHOD AND COMMUNICATIONS APPARATUS

(71) Applicant: Huawei Technologies Co., Ltd., Shenzhen (CN)

(72) Inventors: Xuwen Zhao, Shenzhen (CN); Chengdong He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 17/464,104

(22) Filed: Sep. 1, 2021

(65) Prior Publication Data
US 2021/0400482 A1 Dec. 23, 2021

Related U.S. Application Data

(63) Continuation of application No. PCT/CN2020/074250, filed on Feb. 4, 2020.

(30) Foreign Application Priority Data

Mar. 1, 2019 (CN) .......................... 201910157246.2
Apr. 29, 2019 (CN) .......................... 201910354210.3

(51) Int. Cl.
*H04W 12/06* (2021.01)
*H04L 9/40* (2022.01)
*H04W 12/122* (2021.01)

(52) U.S. Cl.
CPC ......... *H04W 12/06* (2013.01); *H04L 63/1458* (2013.01); *H04L 63/1466* (2013.01); *H04W 12/122* (2021.01); *H04L 2463/141* (2013.01)

(58) Field of Classification Search
CPC ... H04W 12/06; H04W 12/08; H04W 12/122; H04L 63/1458; H04L 63/1466; H04L 2463/141
See application file for complete search history.

(56) References Cited

U.S. PATENT DOCUMENTS 11,722,982 B2 * 8/2023 Shan .................... H04W 60/00
370/254
2011/0302639 A1 12/2011 Matsuda et al.
(Continued)

FOREIGN PATENT DOCUMENTS

CN 1801706 A 7/2006
CN 101998408 A 3/2011
(Continued)

OTHER PUBLICATIONS

3GPP TS 29.503 V15.2.1, "3rd Generation Partnership Project;Technical Specification Group Core Network and Terminals; 5G System; Unified Data Management Services; Stage 3 (Release 15)," Dec. 2018, 175 Pages.
(Continued)

*Primary Examiner* — Khawar Iqbal
(74) *Attorney, Agent, or Firm* — Conley Rose, P.C.

(57) ABSTRACT

An authentication result update method and a communications apparatus, where the authentication result update method includes: determining that an authentication result of a terminal device in a first serving network needs to be updated; and sending a first service invocation request to an authentication server, where the first service invocation request is used to request to update the authentication result stored in a unified data management device, where visited network spoofing can be prevented after authentication is completed, and where network security can be improved.

18 Claims, 19 Drawing Sheets

(56) References Cited

U.S. PATENT DOCUMENTS

| | | | |
|---|---|---|---|
| 2016/0165077 A1 | 6/2016 | Shibata | |
| 2016/0197917 A1 | 7/2016 | Lee et al. | |
| 2020/0153871 A1 | 5/2020 | Lei et al. | |
| 2021/0227392 A1* | 7/2021 | Zhu | H04W 12/082 |
| 2021/0314899 A1* | 10/2021 | Shan | H04W 60/04 |
| 2022/0046752 A1* | 2/2022 | Lee | H04W 76/40 |
| 2022/0053449 A1* | 2/2022 | Shan | H04W 36/0066 |
| 2022/0070664 A1* | 3/2022 | Stojanovski | H04W 12/122 |
| 2022/0095260 A1* | 3/2022 | Shan | H04W 60/04 |
| 2022/0103540 A1* | 3/2022 | Prasad | H04W 12/06 |
| 2022/0132315 A1* | 4/2022 | Kolekar | H04W 12/106 |
| 2022/0141751 A1* | 5/2022 | Yao | H04W 28/0861 370/331 |
| 2022/0182822 A1* | 6/2022 | Ma | H04W 12/06 |
| 2022/0338000 A1* | 10/2022 | Lee | H04W 12/06 |
| 2024/0396893 A1* | 11/2024 | Kunz | H04W 60/00 |

FOREIGN PATENT DOCUMENTS

| | | |
|---|---|---|
| CN | 102111272 A | 6/2011 |
| CN | 107040928 A | 8/2017 |
| CN | 108683690 A | 10/2018 |
| CN | 109041057 A | 12/2018 |
| WO | 2018199668 A1 | 11/2018 |
| WO | 2018202284 A1 | 11/2018 |
| WO | 2019011751 A1 | 1/2019 |
| WO | 2019017837 A1 | 1/2019 |

OTHER PUBLICATIONS

Ericsson et al., "Storing FQDN for S5/S8 interface of the PGW-C+SMF in UDM," 3GPP TSG-SA WG2 Meeting #128bis S2-188530, Sophia Antipolis, France, Aug. 20-24, 2018, 17 Pages.

3GPP TS 29.509 V15.2.0, 3rd Generation Partnership Project; Technical Specification Group Core Network and Terminals;5G System; Authentication Server Services;Stage 3(Release 15), Dec. 2018, 39 Pages.

3GPP TS 33.501 V15.3.1, "3rd Generation Partnership Project; Technical Specification Group Services and System Aspects; Security architecture and procedures for 5G system(Release 15)," Dec. 2018, 182 pages.

3GPP TS 23.501, V1.4.0, Sep. 2017, "3rd Generation Partnership Project; Technical Specification Group Services and System Aspects; System Architecture for the 5G System; Stage 2 (Release 15)," 151 pages.

3GPP TS 23.502, V15.4.1, Jan. 2019, "3rd Generation Partnership Project; Technical Specification Group Services and System Aspects; Procedures for the 5G System; Stage 2 (Release 15)," 347 pages.

3GPP TR 33.899, V1.3.0, Aug. 2017, "3rd Generation Partnership Project; Technical Specification Group Services and System Aspects; Study on the security aspects of the next generation system (Release 14)," 605 pages.

Samsung, "Corrections to multiple authentication vector text references," 3GPP TSG SA WG3 (Security) Meeting #90-Bis S3-180815, Feb. 26-Mar. 2, 2018, San Diego, US, 12 pages.

* cited by examiner

AUTHENTICATION RESULT UPDATE METHOD AND COMMUNICATIONS APPARATUS

CROSS-REFERENCE TO RELATED APPLICATIONS

This application is a continuation of International Patent Application No. PCT/CN2020/074250, filed on Feb. 4, 2020, which claims priority to Chinese Patent Application No. 201910354210.3, filed on Apr. 29, 2019 and Chinese Patent Application No. 201910157246.2, filed on Mar. 1, 2019. All of the aforementioned patent applications are hereby incorporated by reference in their entireties.

TECHNICAL FIELD

This application relates to the field of communications technologies, and more specifically, to an authentication result update method and a communications apparatus.

BACKGROUND

A relatively strong home domain control feature is introduced in a ($5^{th}$ generation) 5G authentication procedure. In this feature, a network device performs authentication on a terminal device through an authentication server function (AUSF) device in a home network, the AUSF sends an authentication result and a serving network name to a unified data management device (UDM) after performing the authentication, and the UDM stores the serving network name and the corresponding authentication result. After the authentication procedure, when a visited network invokes a service from the UDM in the home network, the UDM may use the stored serving network name and the corresponding authentication result to authorize a service invocation initiated by the visited network, to prevent the visited network from spoofing the home network.

However, currently, the AUSF notifies the UDM of the authentication result only after the authentication procedure is completed. In some procedures after the authentication is completed, for example, a de-registration procedure and a non-access stratum security mode command (NAS SMC) rejection procedure, there is no interaction with the AUSF, and the authentication result stored in the UDM is not updated.

If the authentication result stored in the UDM is not removed promptly in an exception case after authentication, the visited network may invoke a service from the home network at any time after the terminal device de-registers from the network. However, the home network processes the service based on the previous authentication result, which may cause malicious charging for a user by the visited network.

Therefore, how to prevent visited network spoofing after authentication is completed to improve network security becomes an urgent problem to be resolved.

SUMMARY

In view of this, this application provides an authentication result update method and a communications apparatus, to prevent visited network spoofing and improve network security.

According to a first aspect, an authentication result update method is provided. The method provided in the first aspect may be performed by a core access and mobility management function device, or a chip disposed in a core access and mobility management function device. This is not limited in this application.

For example, the method includes: The core access and mobility management function device determines that an authentication result of a terminal device in a first serving network needs to be updated. The core access and mobility management function device sends a first service invocation request to an authentication server, where the first service invocation request is used to request to update an authentication result stored in a unified data management device.

In the foregoing technical solution, after determining that the authentication result of the terminal device in the first serving network needs to be updated, the core access and mobility management function device sends the first service invocation request to the authentication server, where the first service invocation request is used to request to update the authentication result stored in the unified data management device. Therefore, after a terminal device authentication procedure ends, the authentication result in a serving network is removed or updated in a timely manner, thereby preventing visited network spoofing and improving network security.

Optionally, the determining that an authentication result of a terminal device in a first serving network needs to be updated includes: when a de-registration request message from the terminal device is received, determining whether the terminal device has only one activated non-access stratum (NAS) connection in the first serving network; and if the terminal device has only one activated NAS connection in the first serving network, determining that the authentication result of the terminal device in the first serving network needs to be updated.

Optionally, the first serving network may be a public land mobile network (PLMN). This is not limited in this embodiment of this application.

With reference to the first aspect, in some possible implementations of the first aspect, the determining that an authentication result of a terminal device in a first serving network needs to be updated includes: when a security mode reject message from the terminal device is received, determining that the authentication result of the terminal device in the first serving network needs to be updated.

After verification on an NAS SMC message fails, the terminal device sends a first message to the core access and mobility management function device, where the first message is an NAS security mode reject message; and determines that the authentication result of the terminal device in the first serving network needs to be updated.

With reference to the first aspect, in some possible implementations of the first aspect, the security mode reject message includes authentication result update indication information, and the authentication result update indication information is used to indicate that the authentication result of the terminal device in the first serving network needs to be updated.

Optionally, after verification on the NAS SMC message fails, the terminal device may further determine whether a currently rejected NAS connection is a last activated NAS connection. If the currently rejected NAS connection is the last activated NAS connection, the terminal device includes one piece of authentication result update indication information in the NAS security mode reject message, where the authentication result update indication information is used to indicate that the authentication result of the terminal device in the first serving network needs to be updated.

Alternatively, in some special scenarios (for example, the terminal device is powered off), it has been indicated that there is currently no signaling interaction or service data transmission between the terminal device and a network. Therefore, the terminal device may directly include the authentication result update indication information in the first message to be sent to the core access and mobility management function device, without determining whether the currently rejected NAS connection is the last activated NAS connection. Then, the core access and mobility management function device updates the authentication result of the terminal device in the first serving network based on the authentication result update indication information.

With reference to the first aspect, in some possible implementations of the first aspect, the determining that an authentication result of a terminal device in a first serving network needs to be updated includes: when a de-registration request message from the terminal device is received, determining that the authentication result of the terminal device in the first serving network needs to be updated.

After the terminal device initiates a de-registration procedure, the terminal device sends the first message to the core access and mobility management function device, where the first message is a de-registration request message, for example, a De-registration Request.

With reference to the first aspect, in some possible implementations of the first aspect, before the determining that an authentication result of a terminal device in a first serving network needs to be updated, the method further includes: sending a de-registration request message to the terminal device, where the de-registration request message includes authentication result update indication information. The determining that an authentication result of a terminal device in a first serving network needs to be updated includes: determining, based on the authentication result update indication information, that the authentication result of the terminal device in the first serving network needs to be updated.

When initiating explicit de-registration, the core access and mobility management function device sends a de-registration request message, for example, a De-registration Request, to the terminal device.

With reference to the first aspect, in some possible implementations of the first aspect, the first service invocation request includes identity information of a serving network and identity information of a user.

The first service request includes the identity information of the serving network and the identity information of the user. After the authentication procedure is completed, the unified data management device stores information such as the identity information of the serving network, the identity information of the user, and the authentication result. When the authentication result needs to be updated, the core access and mobility management function device needs to send the identity information of the corresponding serving network and the identity information of the user to an authentication server function device, and may determine, based on the identity information of the serving network and the identity information of the user, a serving network and a user for which the authentication result needs to be updated.

For example, the first service invocation request includes a serving PLMN ID and a subscription permanent identifier (SUPI). After the authentication procedure is completed, the unified data management device stores information such as the serving PLMN ID, the SUPI, and the authentication result. When the authentication result needs to be updated, the core access and mobility management function device needs to send the serving PLMN ID of the corresponding serving network and the SUPI to the authentication server function device, and may determine, based on the serving PLMN ID and the SUPI, a serving network for which authentication result needs to be updated.

It should be understood that, in this embodiment of this application, the identity information of the serving network and the identity information of the user are not limited to the serving PLMN ID and the SUPI, provided that the serving network and the user can be uniquely identified.

Optionally, the first service invocation request may further include authentication result update identifier information, for example, false or other identifier information.

In the foregoing technical solution, in an NAS SMC reject scenario or a de-registration scenario, the core access and mobility management function device invokes a service of the authentication server function device, and the authentication server function device invokes a service of the unified data management device, to indicate the unified data management device to remove or update an authentication result corresponding to a serving network. In this way, the authentication result in the serving network can be removed or updated in a timely manner. This effectively prevents visited network spoofing and a denial of service (DoS) attack, and improves network security.

According to a second aspect, an authentication result update method is provided. The method provided in the second aspect may be performed by a unified data management device, or a chip disposed in a unified data management device. This is not limited in this application.

The method includes: receiving a second service invocation request, where the second service invocation request is used to request to update an authentication result stored in the unified data management device; and updating, based on the second service invocation request, the authentication result stored in the unified data management device.

In the foregoing technical solution, in a procedure after authentication is completed, a service of the unified data management device is invoked to indicate the unified data management device to remove or update the authentication result, such that the authentication result in a serving network is removed or updated in a timely manner. This effectively prevents visited network spoofing and a DoS attack, and improves network security.

With reference to the second aspect, in some possible implementations of the second aspect, the second service invocation request includes identity information of a serving network, identity information of a user, and authentication failure identifier information.

Optionally, the second service invocation request includes the identity information of the serving network and the identity information of the user.

With reference to the second aspect, in some possible implementations of the second aspect, the updating, based on the second service invocation request, the authentication result stored in the unified data management device includes: removing a corresponding authentication result based on the identity information of the serving network and the identity information of the user; or updating, based on the authentication failure identifier information, the authentication result stored in the unified data management device to an authentication failure.

Optionally, the updating, based on the second service invocation request, the authentication result stored in the unified data management device includes: removing the authentication result corresponding to the identity information of the serving network and the identity information of the user; marking the authentication result corresponding to the identity information of the serving network and the identity information of the user as failure; or marking the authentication result corresponding to the identity information of the serving network and the identity information of the user as invalid.

Optionally, the second service invocation request includes an access type.

Before the updating, based on the second service invocation request, the authentication result stored in the unified data management device, the method further includes: determining whether a user context corresponding to the access type is a target security context, where the target security context is a last user context corresponding to the identity information of the serving network and the identity information of the user. Additionally, the updating, based on the second service invocation request, the authentication result stored in the unified data management device includes: if the user context corresponding to the access type is the target security context, updating, based on the second service invocation request, the authentication result stored in the unified data management device.

According to a third aspect, an authentication result update method is provided. The method provided in the third aspect may be performed by an authentication server function device, or a chip disposed in the authentication server function device. This is not limited in this application.

The method includes: receiving a first service invocation request sent by a core access and mobility management function device, where the first service invocation request is used to request the authentication server function device to initiate an authentication result update; and sending a second service invocation request to a unified data management device, where the second service invocation message is used to request to update an authentication result stored in the unified data management device.

In the foregoing technical solution, in a procedure after authentication is completed, the core access and mobility management function device sends the first service invocation request to the authentication server function device, and the authentication server function device sends the second service invocation request to the unified data management device, to indicate the unified data management device to remove or update the authentication result. In this way, the authentication result in a serving network is removed or updated in a timely manner. This effectively prevents visited network spoofing and a DoS attack, and improves network security.

With reference to the third aspect, in some possible implementations of the third aspect, the first service invocation request includes identity information of the serving network and identity information of a user.

With reference to the third aspect, in some possible implementations of the third aspect, the second service invocation request includes the identity information of the serving network, the identity information of the user, and authentication failure identifier information.

According to a fourth aspect, an authentication result update method is provided. The method provided in the fourth aspect may be performed by a terminal device, or a chip disposed in a terminal device. This is not limited in this application.

The method includes: determining that an authentication result of the terminal device in a first serving network needs to be updated; and sending a first message to a core access and mobility management function device in the first serving network, where the first message is used to indicate to update an authentication result stored in a unified data management device.

Optionally, the first serving network may be a public land mobile network. This is not limited in this embodiment of this application.

In the foregoing technical solution, in some scenarios (for example, a de-registration scenario or an NAS SMC reject scenario) after an authentication procedure is completed, after determining that an authentication result of the terminal device in a public land mobile network PLMN needs to be updated, the terminal device sends the first message to the core access and mobility management function device, where the first message is used to indicate to update the authentication result stored in the UDM. In this way, visited network spoofing and a denial of service (DoS) attack are effectively prevented, and network security is improved.

With reference to the fourth aspect, in some possible implementations of the fourth aspect, the sending a first message to a core access and mobility management function device includes: sending a security mode reject message to the core access and mobility management function device.

With reference to the fourth aspect, in some possible implementations of the fourth aspect, the security mode reject message includes authentication result update indication information, and the authentication result update indication information is used to indicate that the authentication result of the terminal device in the first serving network needs to be updated.

After verification on an NAS SMC message fails, the terminal device sends the first message to the core access and mobility management function device, where the first message is an NAS security mode reject message.

Optionally, the security mode reject message includes authentication result update indication information, and the authentication result update indication information is used to indicate that the authentication result of the terminal device in the first serving network needs to be updated.

Optionally, after verification on the NAS SMC message fails, the terminal device may further determine whether a currently rejected NAS connection is a last activated NAS connection. If the currently rejected NAS connection is the last activated NAS connection, the terminal device includes one piece of authentication result update indication information in the NAS security mode reject message, where the authentication result update indication information is used to indicate that the authentication result of the terminal device in the current first serving network needs to be updated.

Alternatively, in some special scenarios (for example, the terminal device is powered off), it has been indicated that there is currently no signaling interaction or service data transmission between the terminal device and a network. Therefore, the terminal device may directly include the authentication result update indication information in the first message to be sent to the core access and mobility management function device, without determining whether the currently rejected NAS connection is the last activated NAS connection. Then, the core access and mobility management function device updates the authentication result of the terminal device in the first serving network based on the authentication result update indication information.

With reference to the fourth aspect, in some possible implementations of the fourth aspect, the sending a first message to a core access and mobility management function device includes: sending a de-registration request message to the core access and mobility management function device.

After the terminal device initiates a de-registration procedure, the terminal device sends the first message to the core access and mobility management function device, where the first message is a de-registration request message, for example, a De-registration Request.

With reference to the fourth aspect, in some possible implementations of the fourth aspect, the method further includes: receiving a de-registration request message sent by the core access and mobility management function device.

When the core access and mobility management function device initiates explicit de-registration, the terminal device receives the de-registration request message sent by the core access and mobility management function device.

With reference to the fourth aspect, in some possible implementations of the fourth aspect, the method further includes: sending a de-registration request message to the core access and mobility management function device, where the de-registration request message includes authentication result update indication information, and the authentication result update indication information is used to indicate that the authentication result of the terminal device in the first serving network needs to be updated.

Optionally, when initiating the de-registration procedure, the terminal device may further determine whether an NAS connection from which the terminal device currently requests to de-register is the last activated NAS connection. If the NAS connection from which the terminal device currently requests to de-register is the last activated NAS connection, the de-registration request message sent by the terminal device to the core access and mobility management function device carries authentication result update indication information. The authentication result update indication information is used to indicate that the authentication result of the terminal device in the first serving network needs to be updated.

Alternatively, in some special scenarios (for example, the terminal device is powered off), it has been indicated that there is currently no signaling interaction or service data transmission between the terminal device and a network. Therefore, the terminal device may directly include the authentication result update indication information in the first message to be sent to the core access and mobility management function device, without determining whether the NAS connection from which the terminal device currently requests to de-register is the last activated NAS connection. Then, the core access and mobility management function device updates the authentication result of the terminal device in the first serving network based on the authentication result update indication information.

According to a fifth aspect, a communications apparatus is provided. The communications apparatus may be configured to perform an operation of the core access and mobility management function device in the first aspect or any possible implementation of the first aspect. For example, the communications apparatus includes corresponding means configured to perform the steps or functions described in the first aspect. The steps or the functions may be implemented using software, hardware, or a combination of hardware and software.

According to a sixth aspect, a communications apparatus is provided. The communications apparatus may be configured to perform an operation of the unified data management device in the second aspect or any possible implementation of the second aspect. For example, the communications apparatus includes corresponding means configured to perform the steps or functions described in the second aspect. The steps or the functions may be implemented using software, hardware, or a combination of hardware and software.

According to a seventh aspect, a communications apparatus is provided. The communications apparatus may be configured to perform an operation of the authentication server function device in the third aspect or any possible implementation of the third aspect. For example, the communications apparatus includes corresponding means configured to perform the steps or functions described in the third aspect. The steps or the functions may be implemented using software, hardware, or a combination of hardware and software.

According to an eighth aspect, a communications apparatus is provided. The communications apparatus may be configured to perform an operation of the terminal device in the fourth aspect or any possible implementation of the fourth aspect. For example, the communications apparatus includes corresponding means configured to perform the steps or functions described in the fourth aspect. The steps or the functions may be implemented using software, hardware, or a combination of hardware and software.

According to a ninth aspect, a computer program product is provided. The computer program product includes a computer program (which may also be referred to as code or an instruction). When the computer program is run, a computer is enabled to perform the authentication result update method according to any possible implementation of the first aspect to the fourth aspect.

According to a tenth aspect, a computer-readable storage medium is provided. The computer-readable storage medium stores a program, and the program enables a server in a computer to perform the authentication result update method according to any one of implementations of the first aspect to the fourth aspect.

Alternatively, the computer-readable storage medium is configured to store computer software instructions used by the foregoing server, and the computer software instructions include a program designed for performing any authentication result update method according to any possible implementation of the first aspect to the fourth aspect.

According to an eleventh aspect, a chip system is provided. The chip system includes a processor configured to support a server in a computer in implementing the functions according to any one of the first aspect to the fourth aspect or the implementations of the first aspect to the fourth aspect.

DESCRIPTION OF EMBODIMENTS

The following describes technical solutions of this application with reference to the accompanying drawings.

It should be understood that, as classified based on access standards, the technical solutions in the embodiments of this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a wireless cellular network system, a 5G system, and a future communications system.

Figure 1:
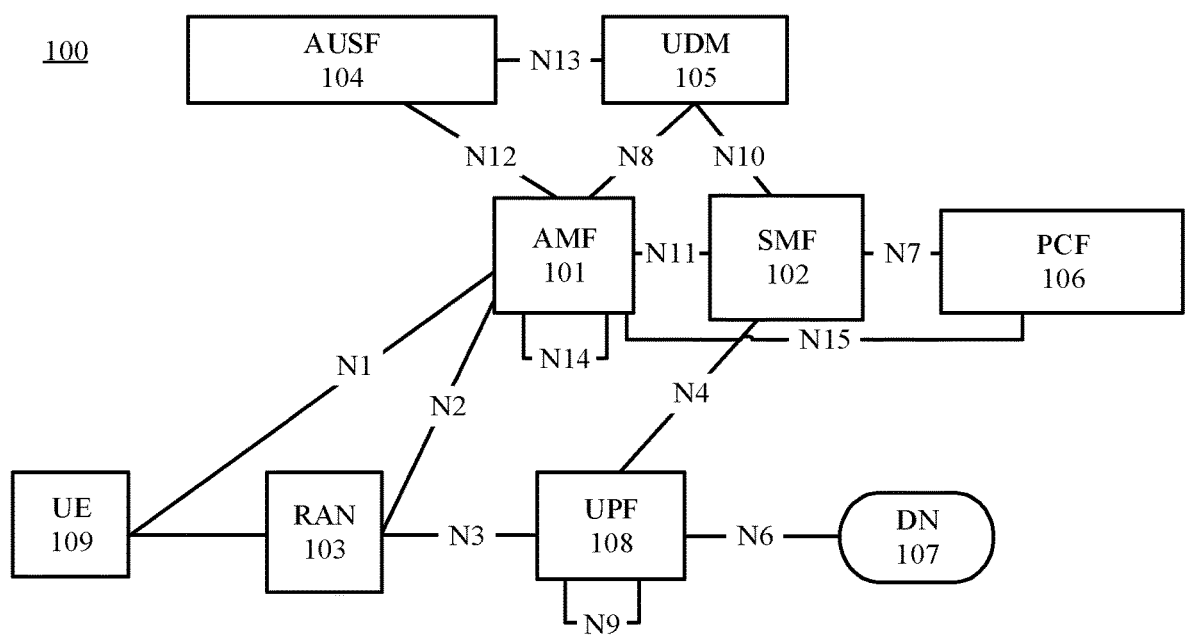
FIG. 1 is a schematic diagram of a communications system using an authentication result update method according to this application.

FIG. 1 is a schematic diagram of a communications system 100 using a wireless communication method according to this application. As shown in FIG. 1, the communications system 100 mainly includes an AMF 101, a session management function (SMF) device 102, a radio access network (RAN) device 103, an authentication server function (AUSF) device 104, a unified data management (UDM) device 105, a policy control function (PCF) device 106, a data network (DN) 107, a user plane function (UPF) device 108, and a terminal device 109 such as a user equipment (UE). The terminal device 109 is connected to the AMF 101 through an N1 interface, and the UE 109 is connected to the RAN 103 using a radio resource control (RRC) protocol. The RAN 103 is connected to the AMF 101 through an N2 interface, and the RAN 103 is connected to the UPF 108 through an N3 interface. A plurality of UPFs 108 are connected through an N9 interface, the UPF 108 is connected to the DN 107 through an N6 interface, and the UPF 108 is connected to the SMF 102 through an N4 interface. The SMF 102 is connected to the PCF 106 through an N7 interface, the SMF 102 is connected to the UDM 105 through an N10 interface, and the SMF 102 is connected to the AMF 101 through an N11 interface. A plurality of AMFs 101 are connected through an N14 interface, the AMF 101 is connected to the UDM 105 through an N8 interface, the AMF 101 is connected to the AUSF 104 through an N12 interface, and the AMF 101 is connected to the PCF 106 through an N15 interface. The AUSF 104 is connected to the UDM 105 through an N13 interface. The AMF 101 and the SMF 102 obtain user subscription data from the UDM 105 through the N8 interface and the N10 interface respectively, and obtain policy data from the PCF 106 through the N15 interface and the N7 interface respectively. The SMF 102 controls the UPF 108 through the N4 interface.

The terminal device 109 may also be referred to as a user equipment (UE), a terminal, a mobile station (MS), a mobile terminal, or the like. The terminal device may communicate with one or more core networks through a radio access network (RAN). The terminal device may also be referred to as an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, or the like.

The radio access network RAN 103 may include a device, for example, a base station or a base station controller, that communicates with the terminal device 109. It should be understood that the RAN 103 may communicate with any quantity of terminal devices similar to the terminal device 109. Each RAN may provide communication coverage for a specific geographic area, and may communicate with a terminal device located in the coverage area (cell). The RAN 103 may support communications protocols of different standards, or may support different communication modes. Optionally, the RAN 103 may be an evolved NodeB (eNodeB), a Wi-Fi access point (AP), a worldwide interoperability for microwave access base station (WiMAX BS), a radio controller in a cloud radio access network (CRAN), an access network device in a 5G network, an access network device in a future evolved public land mobile network (PLMN), or the like.

Optionally, one AMF 101 may simultaneously serve a plurality of terminal devices 109.

Optionally, one SMF 102 may simultaneously serve a plurality of terminal devices 109.

Optionally, the AMF 101 may reselect a serving AMF for the terminal device 109.

It should be understood that, when the terminal device 109 enters an idle mode, an RRC connection and the N2 interface for the terminal device 109 may be released.

Aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but not limited to various media that can store, include, and/or carry instructions and/or data.

To prevent visited network spoofing and improve network security, in this embodiment of this application, after authentication is completed, a terminal device sends indication information to indicate an AMF to initiate an authentication result update or the AMF indicates, based on a condition such as reject message determining, the AMF to initiate an authentication result update. Then, the AMF invokes a service of an AUSF, and the AUSF invokes a service of a UDM, to indicate the UDM to remove or update an authentication result corresponding to a serving network. This effectively prevents visited network spoofing and improves network security.

Figure 2:
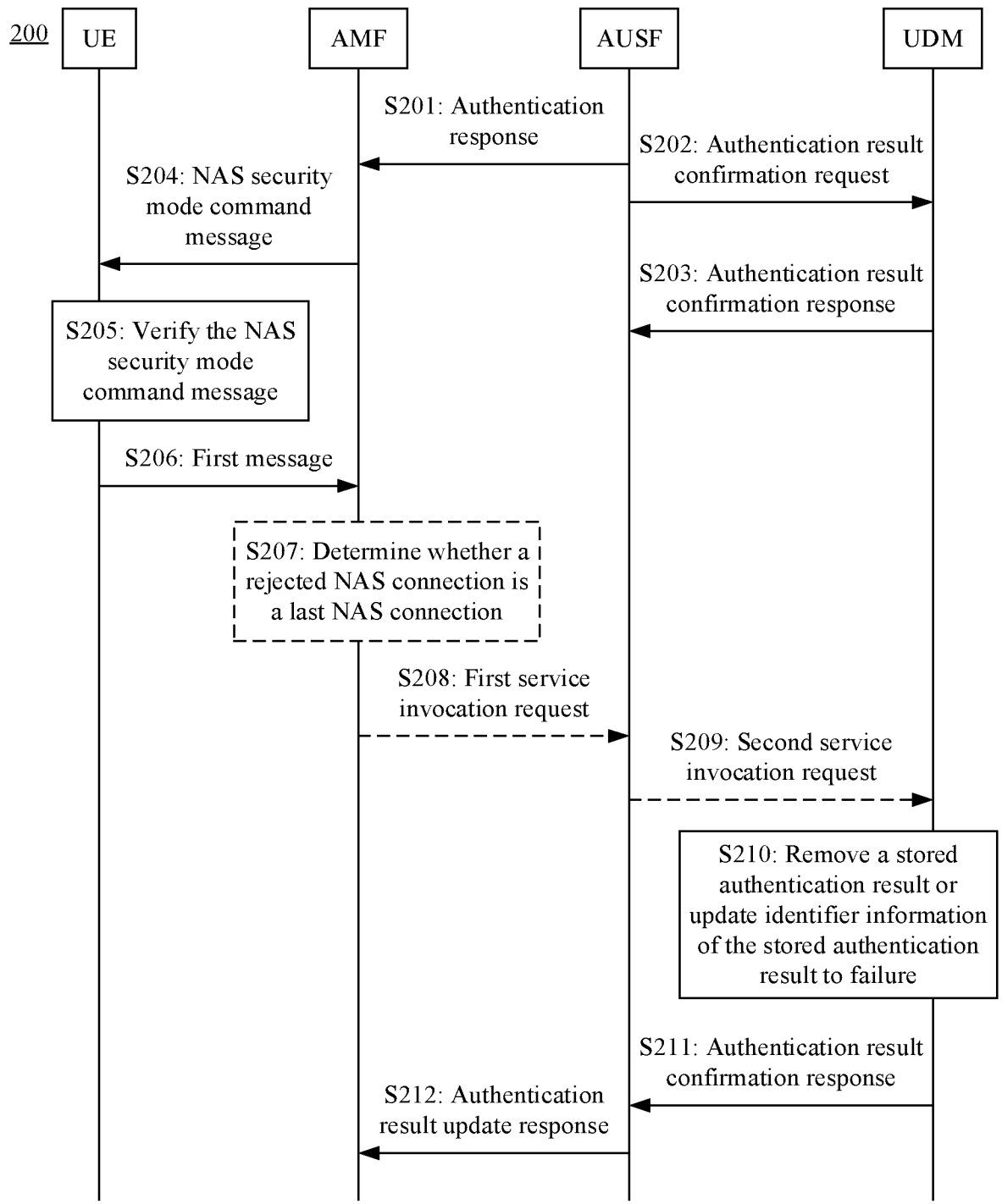
FIG. 2 is a schematic flowchart of an authentication result update method according to an embodiment of this application.

FIG. 2 is a schematic flowchart of an authentication result update method 200 according to an embodiment of this application. The method 200 includes steps S201 to S212, which are described in detail below.

S201: An AUSF sends an authentication response to an AMF.

After an authentication procedure of a terminal device is completed, the AUSF sends the authentication response to the AMF, where the authentication response includes an authentication result.

For example, the AUSF sends the authentication response to the AMF using a terminal device authentication response (Nausf_UEAuthentication_Authentication Response) message.

S202: The AUSF sends an authentication result confirmation request to a UDM.

For example, after the authentication procedure of the terminal device is completed, the AUSF sends information such as identity information of a serving network, identity information of a user, and the authentication result to the UDM using a terminal device authentication confirmation request (Nudm_UEAuthentication_Result Confirmation Request).

For example, the AUSF sends information such as a serving public land mobile network identity (PLMN ID), a subscription permanent identifier (SUPI), and the authentication result to the UDM.

It should be noted that the identity information of the serving network and the identity information of the user that are sent by the AUSF to the UDM are not limited to the serving PLMN ID and the SUPI, provided that the serving network and the user can be uniquely identified. This is not limited in this embodiment of this application. For ease of description, this specification uses the serving PLMN ID and the SUPI as an example.

S203: The UDM sends an authentication result confirmation response to the AUSF.

Step S203 corresponds to step S202. After the AUSF sends the authentication result confirmation request to the UDM, the UDM sends the authentication result confirmation response to the AUSF, indicating a status of storing the authentication result in the UDM.

For example, the UDM uses a terminal device authentication result confirmation response (Nudm_UEAuthentication_Result Confirmation Response) message to send the status of storing the authentication result in the UDM to the AUSF.

In step S201 to step S203, after the authentication procedure is completed, information such as a serving network name, the SUPI, and the authentication result is sent to the UDM, and the authentication result is stored in the UDM. When a visited network invokes a service from the UDM in a home network, the UDM may authorize a service invocation initiated by the visited network based on the stored authentication result. This prevents the visited network from spoofing the home network.

S204: The AMF sends an NAS security mode command message to a UE.

The AMF initiates an NAS SMC procedure and sends the NAS SMC message to the UE. The message includes a UE security capability, a selected NAS security algorithm, and the like.

S205: The UE verifies the NAS security mode command message.

After receiving the NAS SMC message from the AMF, the UE verifies integrity of the message. If verification succeeds, the UE performs NAS integrity protection through encryption and decryption, and sends an NAS security mode complete message to the AMF. The NAS security mode complete message is encrypted and integrity-protected using an encryption and integrity protection algorithm selected in the NAS SMC message. The AMF performs decryption and integrity check on the received NAS security mode complete message using the encryption and integrity protection algorithm selected in the NAS SMC message. If the verification fails, the UE sends an NAS security mode reject (SMR) message carrying a cause value of NAS SMC rejection to the AMF.

For example, when the cause value is #23, it indicates that a cause of the NAS SMC rejection is incorrect matching of UE security parameters; when the cause value is #24, the cause of the security mode rejection is not specified.

S206: The UE sends a first message to the AMF.

After verification on the NAS SMC message fails, the UE sends the first message to the AMF, where the first message is the NAS security mode reject message.

Optionally, after verification on the NAS SMC message fails, the UE may further determine whether a currently rejected NAS connection is a last activated NAS connection. If the currently rejected NAS connection is the last activated NAS connection, the UE optionally includes one piece of authentication result update indication information in the NAS security mode reject message, where the authentication result update indication information is used to indicate that an authentication result of the terminal device in a first serving network needs to be updated.

The terminal device may maintain at least two NAS connections at the same time. When an NAS connection rejected using the NAS SMC reject message is the last activated NAS connection, it indicates that all NAS connections currently maintained by the terminal device are disconnected, and the NAS security mode reject message optionally carries authentication result update indication information. The authentication result update indication information is used to indicate that the authentication result of the terminal device in the first serving network needs to be updated. When the NAS connection rejected using the NAS SMC reject message is not the last activated NAS connection, that is, currently, at least one NAS connection of the terminal device is normally connected, if an authentication result update is directly requested, normal running of a service may be affected. Therefore, during initiation of an authentication result update, it is necessary to determine whether the currently rejected NAS connection is the last activated NAS connection.

Alternatively, in some special scenarios (for example, the terminal device is powered off), it has been indicated that there is currently no signaling interaction or service data transmission between the UE and the network. Therefore, the UE may optionally directly include the authentication result update indication information in the first message to be sent to the AMF, without determining whether the currently rejected NAS connection is the last activated NAS connection. Then, the AMF updates the authentication result of the terminal device in the first serving network based on the authentication result update indication information.

S207: Optionally, the AMF determines whether the currently rejected NAS connection is the last activated NAS connection.

After receiving the NAS security mode reject message, the AMF optionally determines whether the currently rejected NAS connection is the last activated NAS connection. If the currently rejected NAS connection is the last activated NAS connection, the AMF invokes a service of the AUSF to indicate to initiate an authentication result update.

Optionally, if in S206, the UE determines that the currently rejected NAS connection is not the last activated NAS connection after verification on the NAS SMC message fails, S207 may not be performed.

In some possible implementations, in both S206 and S207, whether the currently rejected NAS connection is the last activated NAS connection may be determined. This is not limited in this embodiment of this application.

In addition, in step S206, if the first message optionally directly includes the authentication result update indication information, step S207 may not be performed.

After receiving the NAS security mode reject message, the AMF may alternatively directly invoke a service of the AUSF to indicate to initiate an authentication result update.

S208: The AMF sends a first service invocation request to the AUSF.

When the AMF determines that an authentication result of the terminal device in a current PLMN needs to be updated, (for example, in S207, it is determined that the currently rejected NAS connection is the last activated NAS connection, the first message received by the AMF from the UE carries the authentication result update indication information, or the AMF receives the first message sent by the UE, for example, an NAS SMC reject message), the AMF sends the first service invocation request to the AUSF, and invokes a service of the AUSF to indicate the AUSF to initiate an authentication result update, where the first service invocation request is used to request to update the authentication result stored in the unified data management UDM device.

Optionally, if it is not determined in S207 whether the currently rejected NAS connection is the last activated NAS connection, the AMF invokes a service of the AUSF based on the authentication result update indication information optionally carried in the NAS security mode reject message, or initiates an authentication result update based on the NAS security mode reject message.

For example, the AMF uses a terminal device authentication result update request (Nausf_UEAuthentication_Result_Update Request) to indicate the AUSF to initiate an authentication result update. The service is a service used to indicate the AUSF to remove or update the authentication result or mark the authentication result as invalid in the UDM. A service name is not limited in this embodiment of this application.

The first service request includes the identity information of the serving network and the identity information of the user. After the authentication procedure is completed, the UDM stores information such as the identity information of the serving network, the identity information of the user, and the authentication result. When the authentication result needs to be updated, the AMF needs to send the identity information of the corresponding serving network and the identity information of the user to the AUSF. The serving network and the user for which the authentication result needs to be updated may be determined based on the identity information of the serving network and the identity information of the user.

For example, the first service request includes the serving PLMN ID and the SUPI. After the authentication procedure is completed, the UDM stores information such as the serving PLMN ID, the SUPI, and the authentication result. When the authentication result needs to be updated, the AMF needs to send the serving PLMN ID of a corresponding serving network and the SUPI to the AUSF. The serving network for which the authentication result needs to be updated may be determined based on the serving PLMN ID and the SUPI.

It should be understood that, in this embodiment of this application, the identity information of the serving network and the identity information of the user are not limited to the serving PLMN ID and the SUPI, provided that the serving network and the user can be uniquely identified.

Optionally, the first service invocation request may further include authentication result update identifier information, for example, false, invalid, or other identifier information.

Optionally, the first service invocation request may further include timestamp information. The information is used for anti-replay (preventing a replay attack), and is used by the UDM to record a time point at which the authentication result is updated.

S209: The AUSF sends a second service invocation request to the UDM.

After receiving an authentication result update request sent by the AMF, the AUSF sends the second service invocation request to the UDM to invoke a service of the UDM, where the second service invocation request is a service used to indicate the UDM to remove or update the authentication result or mark the authentication result as invalid. A service name is not limited in this embodiment of this application.

For example, the second service invocation request includes the identity information of the serving network and the identity information of the user.

The second service request includes the identity information of the serving network and the identity information of the user. After the authentication procedure is completed, the UDM stores information such as the identity information of the serving network, the identity information of the user, and the authentication result. When the authentication result needs to be updated, the AMF or the AUSF needs to send the identity information of the corresponding serving network and the identity information of the user to the UDM. The serving network and the user for which the authentication result needs to be updated may be determined based on the identity information of the serving network and the identity information of the user.

For example, the second service invocation request includes the serving PLMN ID and the SUPI, and optionally includes an authentication result update identifier. The UDM searches, based on the serving PLMN ID and the SUPI that are included in the second service invocation request, the stored authentication result for the corresponding serving network and the user for which the authentication result needs to be updated, and updates the authentication result to failure, marks the authentication result as invalid, or removes authentication result data.

Optionally, the second service invocation request may alternatively be an existing terminal device authentication result confirmation (Nudm_UEAuthentuication_Result Confirmation) service that is sent through a UDM interface. The authentication result update identifier may be false, invalid, or another value indicating failure. This is not limited in this embodiment of this application.

Optionally, the second service invocation request may further include timestamp information. The information is used for anti-replay, and is used by the UDM to record a time point at which the authentication result is updated.

S210: The UDM removes the stored authentication result, or updates identifier information of the stored authentication result to failure.

For example, the UDM removes the authentication result in the corresponding serving network based on the serving PLMN ID and the SUPI in the service request sent by the AUSF, or updates the authentication result to any other value indicating failure, or marks the authentication result in the corresponding serving network as invalid. This is not limited in this embodiment of this application.

Optionally, the UDM removes or updates the authentication result or marks the authentication result as invalid in the corresponding serving network based on the authentication result update identifier in the service request sent by the AUSF. For example, the UDM removes or updates the authentication result based on a false value.

Optionally, the UDM may further directly determine, based on the service name, a serving network for which the authentication result needs to be removed or updated, or mark the authentication result in the corresponding serving network as invalid.

For example, S210 may be replaced by: removing an authentication result corresponding to the identity information of the serving network and the identity information of the user; marking an authentication result corresponding to the identity information of the serving network and the identity information of the user as failure; or marking an authentication result corresponding to the identity information of the serving network and the identity information of the user as invalid. Optionally, if the second service invocation request further includes timestamp information, the UDM may store the timestamp to record a time point at which the authentication result is updated.

S211: The UDM sends an authentication result confirmation response to the AUSF.

After removing or updating the authentication result or marking the authentication result in the corresponding serving network as invalid, the UDM returns a service invocation response to the AUSF, indicating an update result of the authentication result.

For example, the UDM sends a terminal device authentication result confirmation response (Nudm_UEAuthentication_Result Confirmation Response) to the AUSF, to indicate an update status of the authentication result in the UDM to the AUSF.

S212: The AUSF sends an authentication result update response to the AMF.

After receiving the service invocation response returned by the UDM, the AUSF sends the authentication result update response to the AMF, to indicate the update status of the authentication result.

For example, the AUSF sends a terminal device authentication result update response (Nausf_UEAuthentication_Result Update Response) to the AMF, to indicate the update status of the authentication result in the UDM to the AMF.

In the foregoing technical solution, in an NAS SMC reject scenario in a registration procedure, the UE sends the indication information or the AMF indicates, based on a condition such as reject message determining, the AMF to initiate an authentication result update. Then, the AMF invokes a service of the AUSF, and the AUSF invokes a service of the UDM, to indicate the UDM to remove or update an authentication result corresponding to a serving network, or mark the authentication result in the corresponding serving network as invalid. In this way, in the NAS SMC reject scenario, the authentication result in the serving network is removed or updated in a timely manner, or the authentication result in the corresponding serving network is marked as invalid. This effectively prevents visited network spoofing and a denial of service (DoS) attack, and improves network security.

Figure 3:
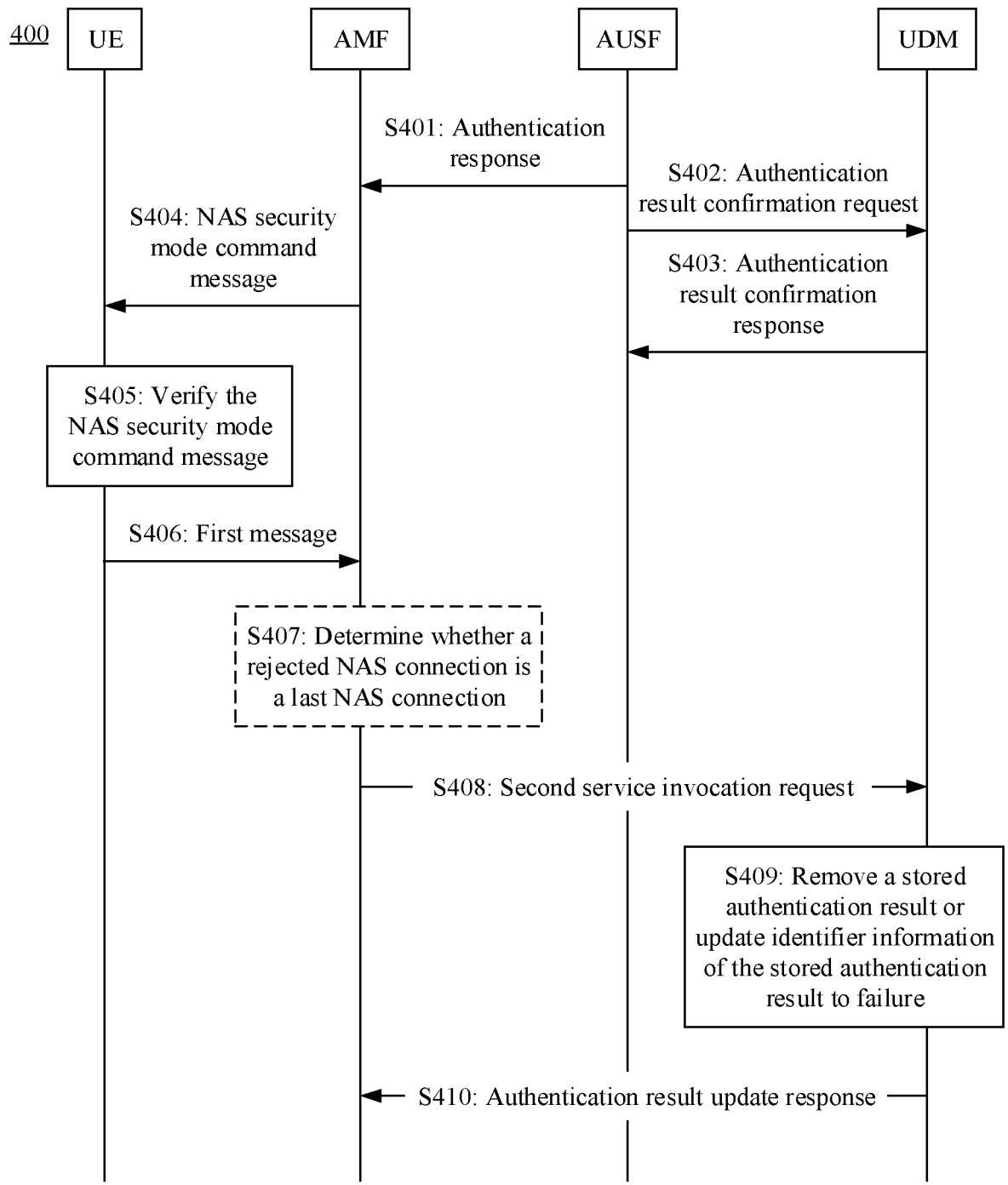
FIG. 3 is a schematic flowchart of an authentication result update method according to an embodiment of this application.

FIG. 3 is a schematic flowchart of an authentication result update method 400 according to another embodiment of this application. The method 400 includes steps S401 to S410, which are described in detail below.

S401: An AUSF sends an authentication response to an AMF.

For example, the AUSF sends the authentication response to the AMF using an Nausf_UEAuthentication_Authentication Response.

S402: The AUSF sends an authentication result confirmation request to a UDM.

For example, after an authentication procedure is completed, the AUSF sends information such as a serving PLMN ID, a SUPI, and an authentication result to the UDM using an Nudm_UEAuthentication_Result Confirmation Request.

S403: The UDM sends an authentication result confirmation response to the AUSF.

Step S403 corresponds to step S402. After the AUSF sends the authentication result confirmation request to the UDM, the UDM sends the authentication result confirmation response to the AUSF, indicating a status of storing the authentication result in the UDM.

For example, the UDM sends, to the AUSF using an Nudm_UEAuthentication_Result Confirmation Response, the status of storing the authentication result in the UDM.

Steps S401 to S403 are the same as steps S201 to S203. After the authentication procedure is completed, information such as the serving PLMN ID, the SUPI, and the authentication result is sent to the UDM, and the authentication result is stored in the UDM. When a visited network invokes a service from the UDM in a home network, the UDM may authorize a service invocation initiated by the visited network based on the stored authentication result. This prevents the visited network from spoofing the home network.

S404: The AMF sends an NAS security mode command message to a UE.

The AMF initiates an NAS SMC procedure and sends the NAS SMC message to the UE. The message includes a UE security capability, a selected NAS security algorithm, and the like.

S405: The UE verifies the NAS security mode command message.

After receiving the NAS SMC message from the AMF, the UE verifies integrity of the message. For a process, refer to S205. Details are not described herein again.

S406: The UE sends a first message to the AMF.

After verification on the NAS SMC message fails, the UE sends the first message to the AMF, where the first message is an NAS security mode reject message. Optionally, after verification on the NAS SMC message fails, the UE may further determine whether a currently rejected NAS connection is a last activated NAS connection. If the currently rejected NAS connection is the last activated NAS connection, the UE optionally includes one piece of authentication result update indication information in the NAS security mode reject message, where the authentication result update indication information is used to indicate that an authentication result of the terminal device in a first serving network needs to be updated.

Alternatively, in some special scenarios (for example, the terminal device is powered off), it has been indicated that there is currently no signaling interaction or service data transmission between the UE and the network. Therefore, the UE may optionally directly include the authentication result update indication information in the first message to be sent to the AMF, without determining whether the currently rejected NAS connection is the last activated NAS connection. Then, the AMF updates the authentication result of the terminal device in the first serving network based on the authentication result update indication information.

S407: Optionally, the AMF determines whether the currently rejected NAS connection is the last activated NAS connection.

After receiving the NAS security mode reject message, the AMF optionally determines whether the currently rejected NAS connection is the last activated NAS connection. If the currently rejected NAS connection is the last activated NAS connection, the AMF invokes a service of the AUSF to indicate to initiate an authentication result update.

After receiving the NAS security mode reject message, the AMF may alternatively directly invoke a service of the AUSF to indicate to initiate an authentication result update.

Optionally, if in S406, the UE determines that the currently rejected NAS connection is not the last NAS after verification on the NAS SMC message fails, S407 may not be performed.

In some possible implementations, in both S406 and S407, whether the currently rejected NAS connection is the last activated NAS connection may be determined. This is not limited in this embodiment of this application.

In addition, in S406, if the first message optionally directly includes the authentication result update indication information, step S207 may not be performed.

After receiving the NAS security mode reject message, the AMF may alternatively directly invoke a service of the AUSF to indicate to initiate an authentication result update.

S408: The AMF sends a second service invocation request to the UDM.

When the AMF determines that an authentication result of the terminal device in a current PLMN needs to be updated, (for example, in S207, it is determined that the currently rejected NAS connection is the last activated NAS connection, the first message received by the AMF from the UE carries the authentication result update indication information, or the AMF receives the first message sent by the UE, for example, an NAS SMC reject message), the AMF invokes a service of the UDM to indicate the UDM to initiate an authentication result update, where the second service invocation request is used to request to update the authentication result stored in the unified data management UDM device.

Optionally, if it is not determined in S407 whether the currently rejected NAS connection is the last activated NAS connection, the AMF invokes a service of the UDM based on the NAS security mode reject message or optionally based on the authentication result update indication information carried in the NAS security mode reject message, to initiate an authentication result update.

For example, the AMF uses a terminal device authentication result update request (Nudm_UEAuthentication_Result_Update Request) service or a de-registration service to indicate the UDM to initiate an authentication result update. The second service invocation request is used to indicate the UDM to remove or update the stored authentication result, or mark an authentication result in a corresponding serving network as invalid. A service name is not limited in this embodiment of this application.

The second service request includes identity information of the serving network and identity information of a user. After the authentication procedure is completed, the UDM stores information such as the identity information of the serving network, the identity information of the user, and the authentication result. When the authentication result needs to be updated, the AMF or the AUSF needs to send the identity information of the corresponding serving network and the identity information of the user to the UDM. The serving network and the user for which the authentication result needs to be updated may be determined based on the identity information of the serving network and the identity information of the user.

For example, the second service invocation request includes the serving PLMN ID and the SUPI, and optionally includes an authentication result update identifier and an access type (for example, $3^{rd}$ Generation Partnership Project (3GPP) access and/or non-3GPP access). The UDM searches, based on the serving PLMN ID and the SUPI that are included in the second service invocation request, the stored authentication result for the corresponding serving network and the user for which the authentication result needs to be updated, and updates the authentication result to failure, marks the authentication result in the corresponding serving network as invalid, or removes the authentication result.

Optionally, the second service invocation request may further include timestamp information. The information is used for anti-replay, and is used by the UDM to record a time point at which the authentication result is updated.

S409: The UDM removes the stored authentication result, updates identifier information of the stored authentication result to failure, or marks the authentication result in the corresponding serving network as invalid.

The UDM removes the authentication result in the corresponding serving network based on the serving PLMN ID and the SUPI in the service request sent by the AMF, updates the authentication result to any other value indicating failure, or marks the authentication result in the corresponding serving network as invalid. This is not limited in this embodiment of this application.

Optionally, the UDM removes or updates the authentication result, or marks the authentication result in the corresponding serving network as invalid, based on the authentication result update identifier in the service request sent by the AMF. For example, the UDM removes or updates the authentication result based on a false value, or marks the authentication result in the corresponding serving network as invalid.

Optionally, the UDM may further directly determine, based on the service name (for example, a de-registration service), a serving network for which the authentication result needs to be removed or updated, or mark the authentication result in the corresponding serving network as invalid. A specific service name is not limited in this embodiment of this application.

Optionally, the second service invocation request includes an access type. Before that the UDM removes the stored authentication result, updates the identifier information of the stored authentication result to failure, or marks the authentication result in the corresponding serving network as invalid, the method further includes: determining whether a user context corresponding to the access type is a target security context, where the target security context is a last user context corresponding to the identity information of the serving network and the identity information of the user.

That the UDM removes the stored authentication result, updates identifier information of the stored authentication result to failure, or marks the authentication result in the corresponding serving network as invalid includes: If the user context corresponding to the access type is the target security context, the UDM removes the stored authentication result, updates the identifier information of the stored authentication result to failure, or marks the authentication result in the corresponding serving network as invalid.

Optionally, the UDM determines whether the user context corresponding to the access type in the second service invocation request is a last user context of the user corresponding to the SUPI in a serving network corresponding to the serving PLMN ID.

For example, after receiving the second service invocation request, the UDM searches for a corresponding user context based on the serving PLMN ID and/or the SUPI in the second service invocation request, for example, obtains (SUPI, serving PLMN ID, 3GPP access, user context) and/or (SUPI, serving PLMN ID, non-3GPP access, user context). Then, the UDM determines whether the user context obtained through searching is the last user context based on an access type parameter. If the obtained context is the last user context, the UDM determines a serving network for which the authentication result needs to be removed or updated, or marks the authentication result in the corresponding serving network as invalid.

Optionally, if the second service invocation request further includes timestamp information, the UDM may store the timestamp to record a time point at which the authentication result is updated.

S410: The UDM sends an authentication result confirmation response to the AMF.

After removing or updating the authentication result, the UDM returns a service invocation response to the AUSF, to indicate an update status of the authentication result. For example, the UDM sends a terminal device authentication result confirmation response (Nudm_UEAuthentication_Result Update Response) to the AMF, to indicate an update status of the authentication result in the UDM to the AMF.

In the foregoing technical solution, in an NAS SMC reject scenario in a registration procedure, the UE sends the indication information or the AMF indicates, based on a condition such as reject message determining, the AMF to initiate an authentication result update. Then, the AMF directly invokes a service of the UDM, to indicate the UDM to remove or update an authentication result corresponding to a serving network. This effectively prevents visited network spoofing and a DoS attack, and simplifies a process of promptly removing or updating an authentication result in a serving network in the NAS SMC reject scenario.

If SMC is initiated in a registration procedure, the AMF terminates the registration procedure after receiving the NAS security mode reject message. If SMC is initiated after the registration procedure, the AMF terminates a current SMC procedure after receiving the NAS security mode reject message, and continues to use a previous security context.

When the UE initiates a de-registration procedure, if no protocol data unit (PDU) session is established between the UE and the network, the AMF may directly return a de-registration accept message to the UE. In this case, the AMF does not indicate the AUSF or the UDM to update the authentication result. If a PDU session has been established between the UE and the network, the AMF indicates a session management function (SMF) to release the PDU session, and the SMF de-registers from the UDM. In this case, the UDM deletes only the related session and a registration status of the SMF, and does not update the authentication result.

Figure 4:
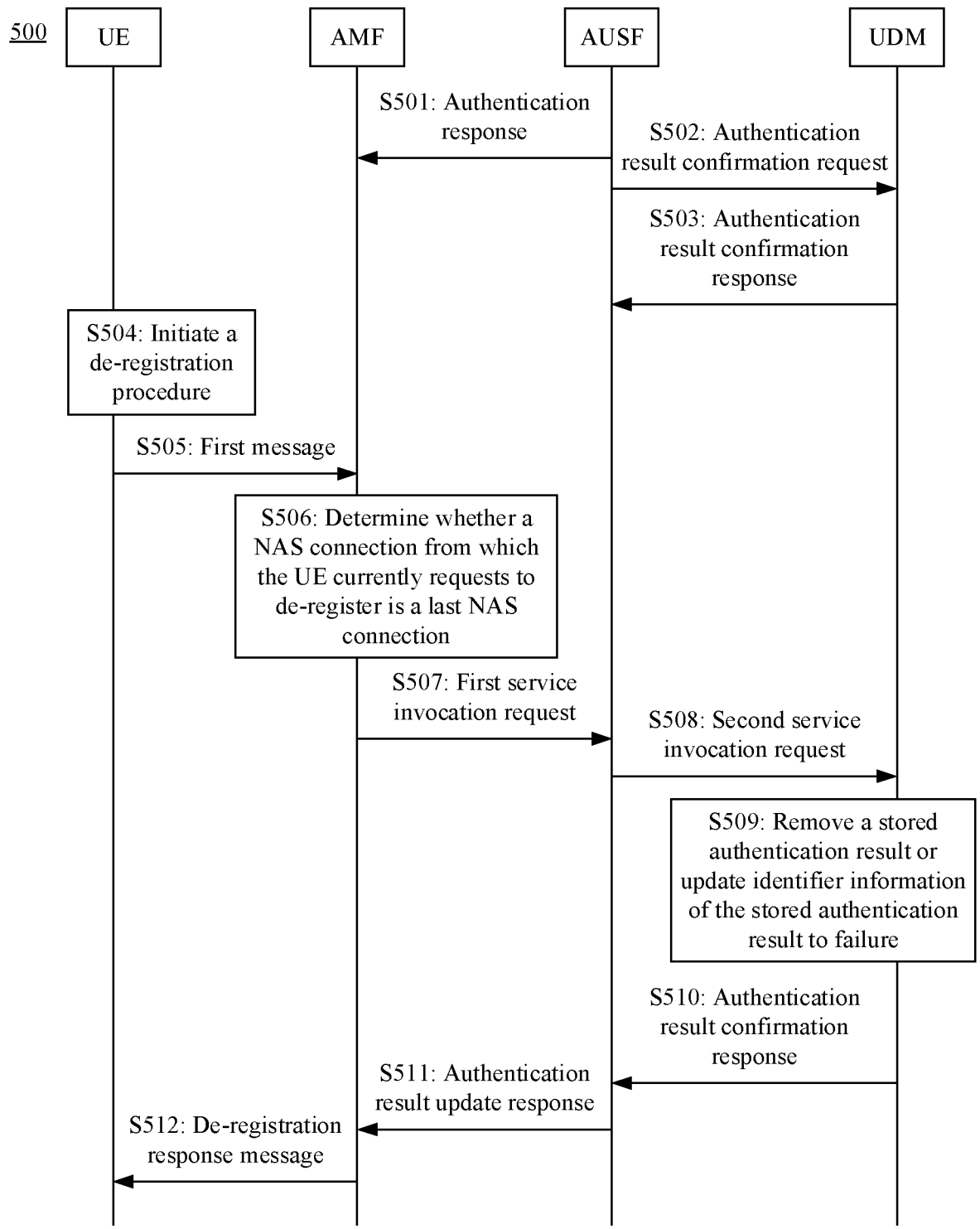
FIG. 4 is a schematic flowchart of an authentication result update method according to an embodiment of this application.

FIG. 4 is a schematic flowchart of an authentication result update method 500 according to still another embodiment of this application. The method 500 includes steps S501 to S512, which are described in detail below.

S501: An AUSF sends an authentication response to an AMF.

S502: The AUSF sends an authentication result confirmation request to a UDM.

S503: The UDM sends an authentication result confirmation response to the AUSF.

Steps S501 to S503 are the same as steps S201 to S203. For details, refer to the descriptions of S201 to S203. Details are not described herein again.

S504: A UE initiates a de-registration procedure.

After a registration procedure is completed, the UE initiates the de-registration procedure.

S505: The UE sends a first message to the AMF.

After the UE initiates the de-registration procedure, the UE sends the first message to the AMF, where the first message is a de-registration request message, for example, a De-registration Request.

Optionally, in S504, when initiating the de-registration procedure, the UE may further determine whether an NAS connection from which the UE currently requests to de-register is a last activated NAS connection. If the NAS connection from which the UE currently requests to de-register is the last activated NAS connection, in S505, the de-registration request message sent by the UE to the AMF optionally carries authentication result update indication information. The authentication result update indication information is used to indicate that an authentication result of the terminal device in a first serving network needs to be updated.

Alternatively, in some special scenarios (for example, the terminal device is powered off), it has been indicated that there is currently no signaling interaction or service data transmission between the UE and the network. Therefore, the UE may optionally directly include the authentication result update indication information in the first message to be sent to the AMF, without determining whether the NAS connection from which the UE currently requests to de-register is the last activated NAS connection. Then, the AMF updates the authentication result of the terminal device in the first serving network based on the authentication result update indication information.

S506: Optionally, the AMF determines whether the NAS connection from which the UE currently requests to de-register is the last activated NAS connection.

After receiving the de-registration request message sent by the UE, the AMF determines whether the NAS connection from which the UE currently requests to de-register is the last activated NAS connection. If the NAS connection is the last activated NAS connection, the AMF invokes a service of the AUSF to indicate to initiate an authentication result update.

Optionally, if in S504, the UE initiates the de-registration procedure and then determines that the NAS connection from which the UE currently requests to de-register is not the last NAS, S506 may not be performed.

In some possible implementations, whether the current NAS connection is the last activated NAS connection may be determined in both S504 and S506. This is not limited in this embodiment of this application.

In addition, if the first message in S505 optionally directly includes the authentication result update indication information, step S506 may not be performed.

S507: The AMF sends a first service invocation request to the AUSF.

S508: The AUSF sends a second service invocation request to the UDM.

S509: The UDM removes the stored authentication result, updates identifier information of the stored authentication result to failure, or marks an authentication result in a corresponding serving network as invalid.

S510: The UDM sends an authentication result confirmation response to the AUSF.

S511: The UDM sends an authentication result update response to the AUSF.

For step S507 to step S511, refer to step S208 to step S212. Details are not described herein again.

S512: The AMF sends a de-registration response message to the UE.

After receiving the authentication result update response sent by the AUSF, the AMF sends the de-registration response message to the UE, to indicate a de-registration result. For example, the AMF sends a De-registration Response to the UE.

In the foregoing technical solution, in a scenario in which the UE initiates the de-registration procedure, the UE sends the de-registration request to the AMF. Then, the AMF invokes a service of the AUSF, and the AUSF invokes a service of the UDM, to indicate the UDM to remove or update an authentication result corresponding to a serving network, or mark the authentication result in the corresponding serving network as invalid. In this way, in the de-registration procedure, the authentication result in the serving network is removed or updated in a timely manner, or the authentication result in the corresponding serving network is marked as invalid. This effectively prevents visited network spoofing and a DoS attack.

Figure 5:
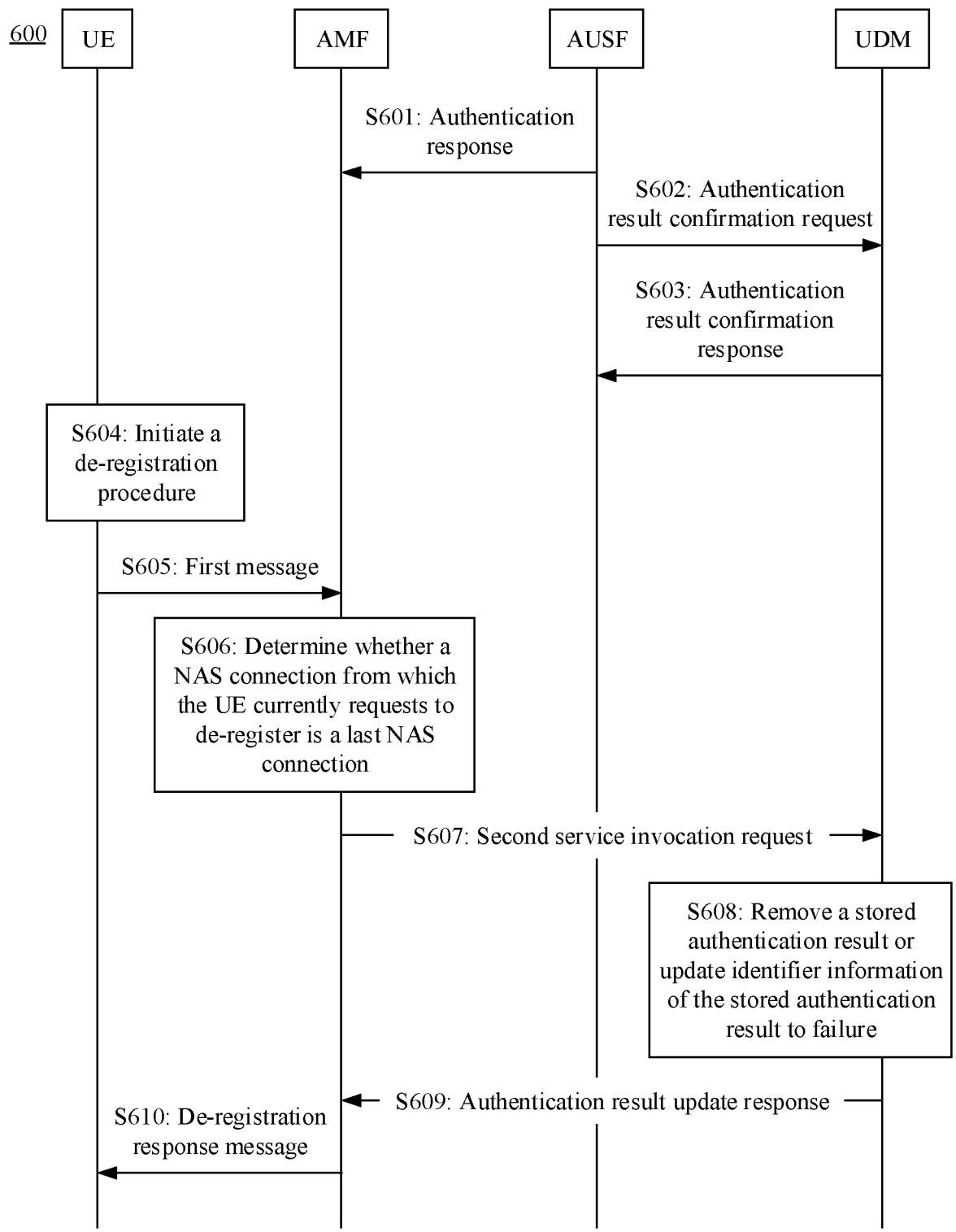
FIG. 5 is a schematic flowchart of an authentication result update method according to another embodiment of this application.

FIG. 5 is a schematic flowchart of an authentication result update method 600 according to yet another embodiment of this application. The method 600 includes steps S601 to S610, which are described in detail below.

S601: An AUSF sends an authentication response to an AMF.

S602: The AUSF sends an authentication result confirmation request to a UDM.

S603: The UDM sends an authentication result confirmation response to the AUSF.

Steps S601 to S603 are the same as steps S201 to S203. For details, refer to the descriptions of S201 to S203. Details are not described herein again.

S604: A UE initiates a de-registration procedure.

After a registration procedure is completed, the UE initiates the de-registration procedure.

S605: The UE sends a first message to the AMF.

After the UE initiates the de-registration procedure, the UE sends the first message to the AMF, where the first message is a de-registration request message, for example, a De-registration Request.

Optionally, in S604, when initiating the de-registration procedure, the UE may further determine whether an NAS connection from which the UE currently requests to de-register is a last activated NAS connection. If the NAS connection from which the UE currently requests to de-register is the last activated NAS connection, in S605, the de-registration request message sent by the UE to the AMF optionally carries authentication result update indication information. The authentication result update indication information is used to indicate that an authentication result of the terminal device in a first serving network needs to be updated.

Alternatively, in some special scenarios (for example, the terminal device is powered off), it has been indicated that there is currently no signaling interaction or service data transmission between the UE and the network. Therefore, the UE may optionally directly include the authentication result update indication information in the first message to be sent to the AMF, without determining whether the NAS connection from which the UE currently requests to de-register is the last activated NAS connection. Then, the AMF updates the authentication result of the terminal device in the first serving network based on the authentication result update indication information.

S606: Optionally, the AMF determines whether the NAS connection from which the UE currently requests to de-register is the last activated NAS connection.

After receiving the de-registration request message sent by the UE, the AMF determines whether the NAS connection from which the UE currently requests to de-register is the last activated NAS connection. If the NAS connection is the last activated NAS connection, the AMF invokes a service of the AUSF to indicate to initiate an authentication result update.

Optionally, if in S604, the UE initiates the de-registration procedure and then determines whether the NAS connection from which the UE currently requests to de-register is the last NAS, S606 may not be performed.

In some possible implementations, whether the NAS connection from which the UE currently requests to de-register is the last activated NAS connection may be determined in both S604 and S606. This is not limited in this embodiment of this application.

In addition, in step S605, if the first message directly includes the authentication result update indication information, step S606 may not be performed.

S607: The AMF sends a second service invocation request to the UDM.

S608: The UDM removes the stored authentication result, updates identifier information of the stored authentication result to failure, or marks an authentication result in a corresponding serving network as invalid.

S609: The UDM sends an authentication result confirmation response to the AMF.

Steps S607 to S609 are the same as steps S408 to S410. For descriptions, refer to S408 to S410. Details are not described herein again.

S610: The AMF sends a de-registration response message to the UE.

After receiving the authentication result update response sent by the UDM, the AMF sends the de-registration response message to the UE, to indicate a de-registration result. For example, the AMF sends a De-registration Response to the UE.

In the foregoing technical solution, in a scenario in which the UE initiates the de-registration procedure, the UE sends the de-registration request to the AMF. Then, the AMF directly invokes a service of the UDM, to indicate the UDM to remove or update an authentication result corresponding to a serving network, or mark the authentication result in the corresponding serving network as invalid. This effectively prevents visited network spoofing and a DoS attack, and simplifies a process of promptly removing or updating an authentication result in a serving network or marking an authentication result in a corresponding serving network as invalid in the de-registration procedure.

Figure 6:
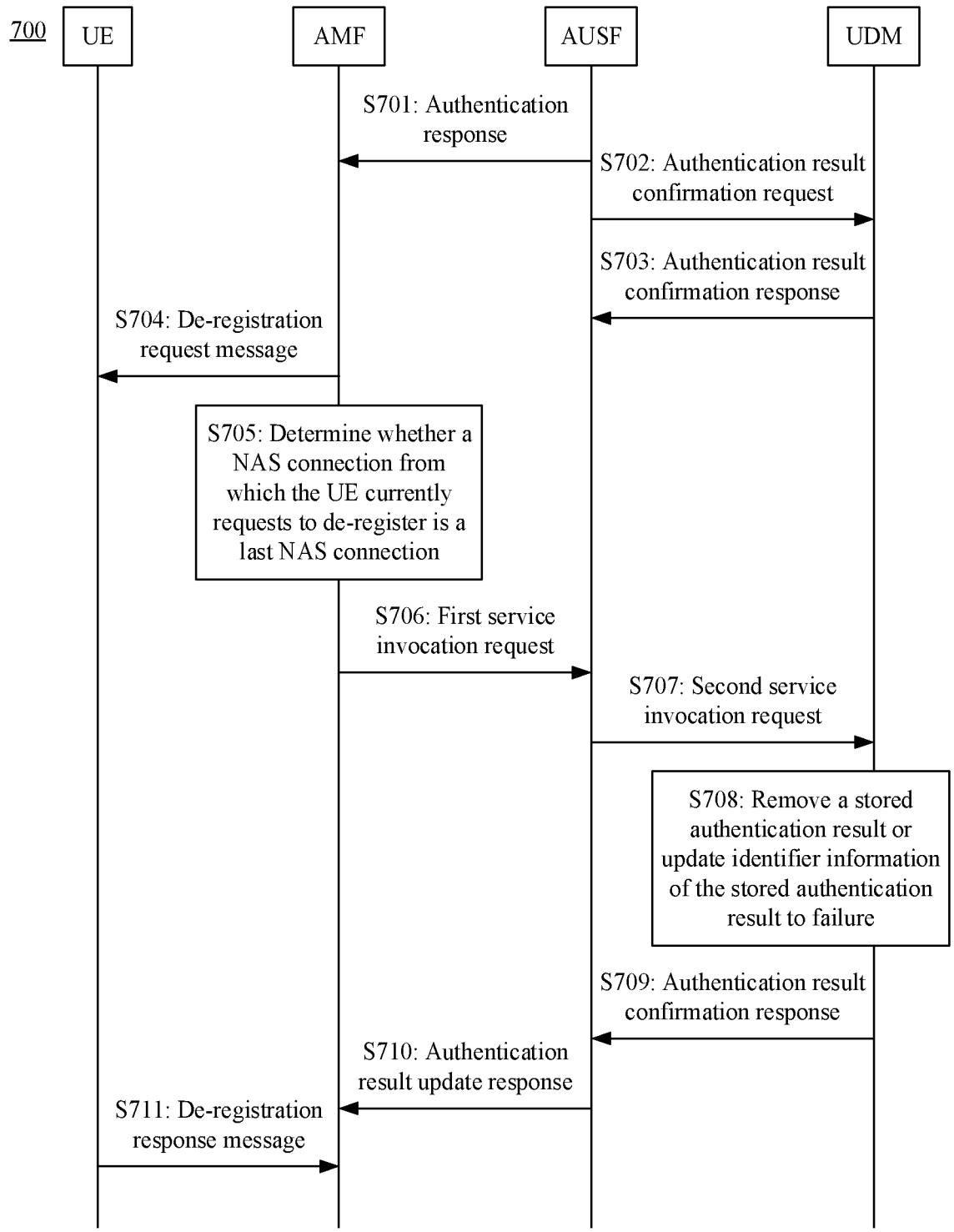
FIG. 6 is a schematic flowchart of an authentication result update method according to another embodiment of this application.

FIG. 6 is a schematic flowchart of an authentication result update method 700 according to still yet another embodiment of this application. The method 700 includes steps S701 to S711, which are described in detail below.

S701: An AUSF sends an authentication response to an AMF.

S702: The AUSF sends an authentication result confirmation request to a UDM.

S703: The UDM sends an authentication result confirmation response to the AUSF.

Steps S701 to S703 are the same as steps S201 to S203. For details, refer to the descriptions of S201 to S203. Details are not described herein again.

S704: The AMF sends a de-registration request message to a UE.

In this embodiment of this application, the AMF initiates a de-registration procedure. When the AMF initiates explicit de-registration, NAS message interaction needs to be performed between the AMF and the UE. For example, the AMF sends a de-registration request message to the UE.

Optionally, when the AMF initiates implicit de-registration, NAS message interaction does not need to be performed between the AMF and the UE. In this case, S704 may not be performed.

S705: Optionally, the AMF determines whether an NAS connection from which the UE currently requests to de-register is a last activated NAS connection.

Optionally, after initiating the de-registration procedure, the AMF determines whether the NAS connection from which the UE currently requests to de-register is the last activated NAS connection. If the NAS connection is the last activated NAS connection, the AMF invokes a service of the AUSF to indicate to initiate an authentication result update.

Alternatively, in some special scenarios (for example, a terminal device is powered off), in these scenarios, it has been indicated that there is currently no signaling interaction or service data transmission between the UE and a network. Therefore, after initiating the de-registration procedure, the AMF invokes a service of the AUSF to update an authentication result of the terminal device in a current PLMN without determining whether the NAS connection from which the UE currently requests to de-register is the last activated NAS connection.

S706: The AMF sends a first service invocation request to the AUSF.

S707: The AUSF sends a second service invocation request to the UDM.

S708: The UDM removes a stored authentication result, updates identifier information of the stored authentication result to failure, or marks an authentication result in a corresponding serving network as invalid.

S709: The UDM sends an authentication result confirmation response to the AUSF.

S710: The UDM sends an authentication result update response to the AUSF.

For step S706 to step S710, refer to step S208 to step S212. Details are not described herein again.

S711: The UE sends a de-registration response message to the AMF.

S711 corresponds to S704. After the authentication result is updated, the UE sends the De-registration Response to the AMF.

It should be noted that when the AMF initiates implicit de-registration, S704 and S711 may not be performed.

In the foregoing technical solution, in a scenario in which the AMF initiates the de-registration procedure, the AMF invokes a service of the AUSF, and the AUSF invokes a service of the UDM, to indicate the UDM to remove or update an authentication result corresponding to a serving network, or mark the authentication result in the corresponding serving network as invalid. In this way, in the de-registration procedure, the authentication result in the serving network is removed, updated, or marked as invalid. This effectively prevents visited network spoofing and a DoS attack.

Figure 7:
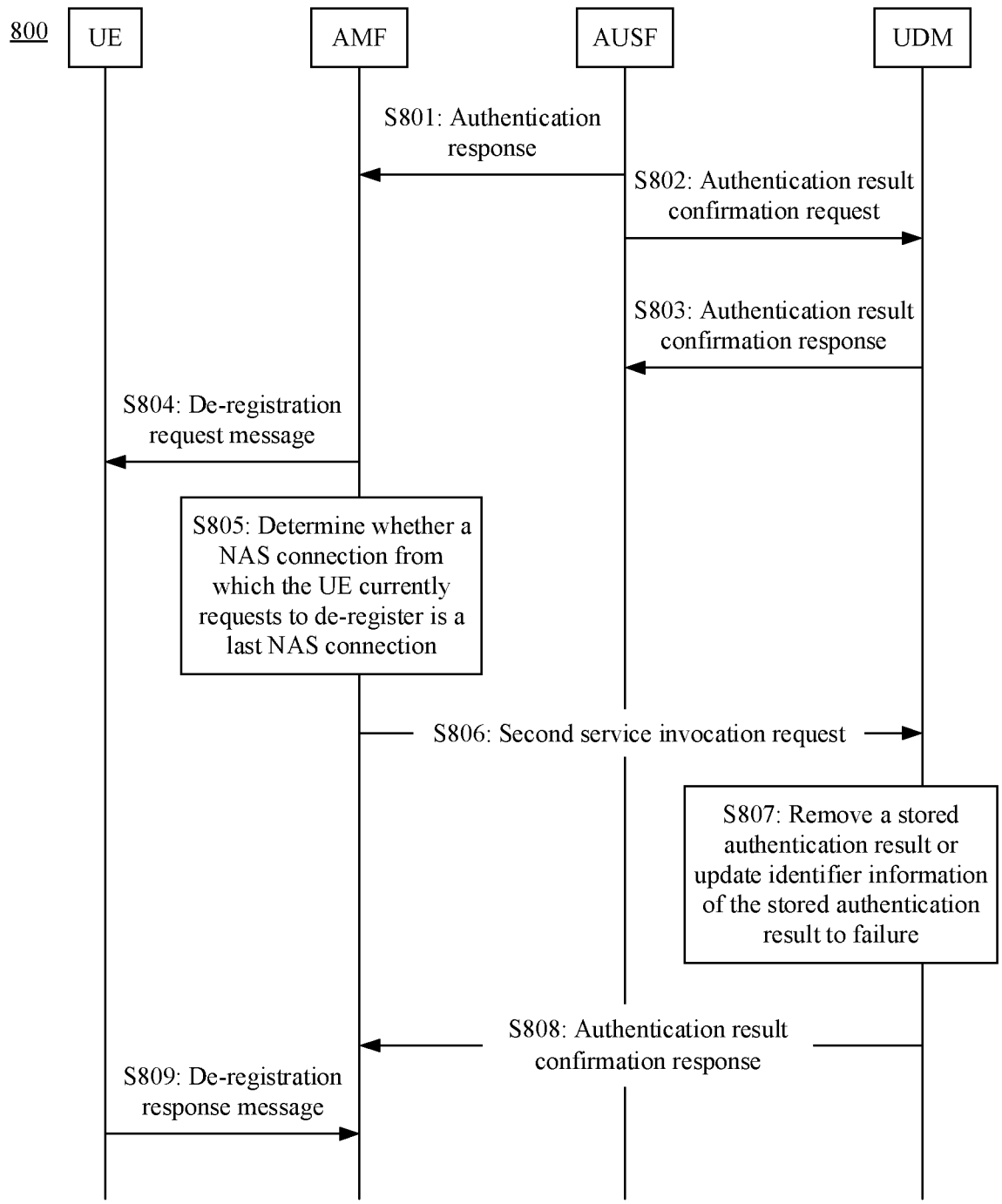
FIG. 7 is a schematic flowchart of an authentication result update method according to still another embodiment of this application.

FIG. 7 is a schematic flowchart of an authentication result update method 800 according to a further embodiment of this application. The method 800 includes steps S801 to S809, which are described in detail below.

S801: An AUSF sends an authentication response to an AMF.

S802: The AUSF sends an authentication result confirmation request to a UDM.

S803: The UDM sends an authentication result confirmation response to the AUSF.

Steps S801 to S803 are the same as steps S201 to S203. For details, refer to the descriptions of S201 to S203. Details are not described herein again.

S804: The AMF sends a first message to a UE.

In this embodiment of this application, the AMF initiates a de-registration procedure. When the AMF initiates explicit de-registration, NAS message interaction needs to be performed between the AMF and the UE. For example, the AMF sends a first message to the UE, and the first message is a de-registration request De-registration Request message.

Optionally, when the AMF initiates implicit de-registration, S804 may not be performed.

S805: Optionally, the AMF determines whether an NAS connection from which the UE currently requests to de-register is a last activated NAS connection.

Optionally, after initiating the de-registration procedure, the AMF determines whether the NAS connection from which the UE currently requests to de-register is the last activated NAS connection. If the NAS connection is the last activated NAS connection, the AMF invokes a service of the AUSF to indicate to initiate an authentication result update.

Alternatively, in some special scenarios (for example, a terminal device is powered off), in these scenarios, it has been indicated that there is currently no signaling interaction or service data transmission between the UE and a network. Therefore, after initiating the de-registration procedure, the AMF invokes a service of the UDM to update an authentication result of the terminal device in a current PLMN without determining whether the NAS connection from which the UE currently requests to de-register is the last activated NAS connection.

S806: The AMF sends a second service invocation request to the UDM.

S807: The UDM removes a stored authentication result, updates identifier information of the stored authentication result to failure, or marks an authentication result in a corresponding serving network as invalid.

S808: The UDM sends an authentication result confirmation response to the AMF.

Steps S806 to S808 are the same as steps S408 to S410. For descriptions, refer to S408 to S410. Details are not described herein again.

S809: The UE sends a de-registration response message to the AMF.

S809 corresponds to S804. After the authentication result is updated, the UE sends the De-registration Response to the AMF.

It should be noted that when the AMF initiates implicit de-registration, S804 and S809 may not be performed.

In the foregoing technical solution, in a scenario in which the AMF initiates the de-registration procedure, the AMF directly invokes a service of the UDM, to indicate the UDM to remove or update an authentication result corresponding to a serving network, or mark the authentication result in the corresponding serving network as invalid. This effectively prevents visited network spoofing and a DoS attack, and simplifies a process of removing or updating an authentication result in a serving network or marking the authentication result as invalid in the de-registration procedure.

During procedures in which UE returns an NAS SMC reject message, the UE initiates de-registration, the UE initiates PDU session release, or the like, a visited network may maliciously tamper with or does not send information reported by the UE to a home network, thereby spoofing the home network and causing malicious charging for the UE. In this embodiment of this application, exception information reported by the UE is encrypted. After receiving the encrypted information, the home network may decrypt the related information and return related indication information to the UE. The UE determines, based on the indication information delivered by the home network, whether the previously reported exception information is tampered with by the visited network, in order to determine whether malicious behavior exists in the visited network.

Figure 8A:
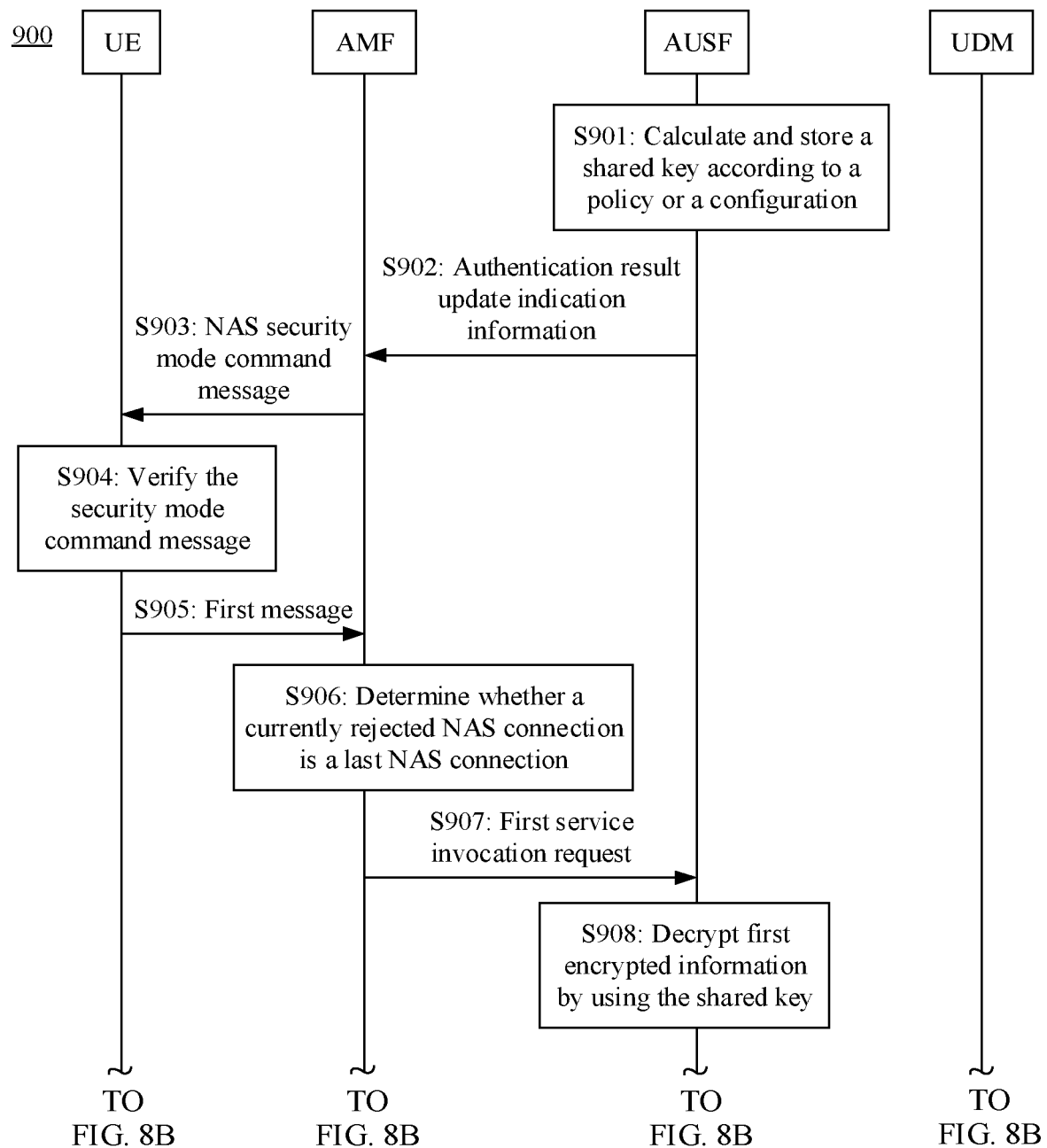
FIG. 8A and FIG. 8B are a schematic flowchart of an authentication result update method according to still another embodiment of this application.
Figure 8B:
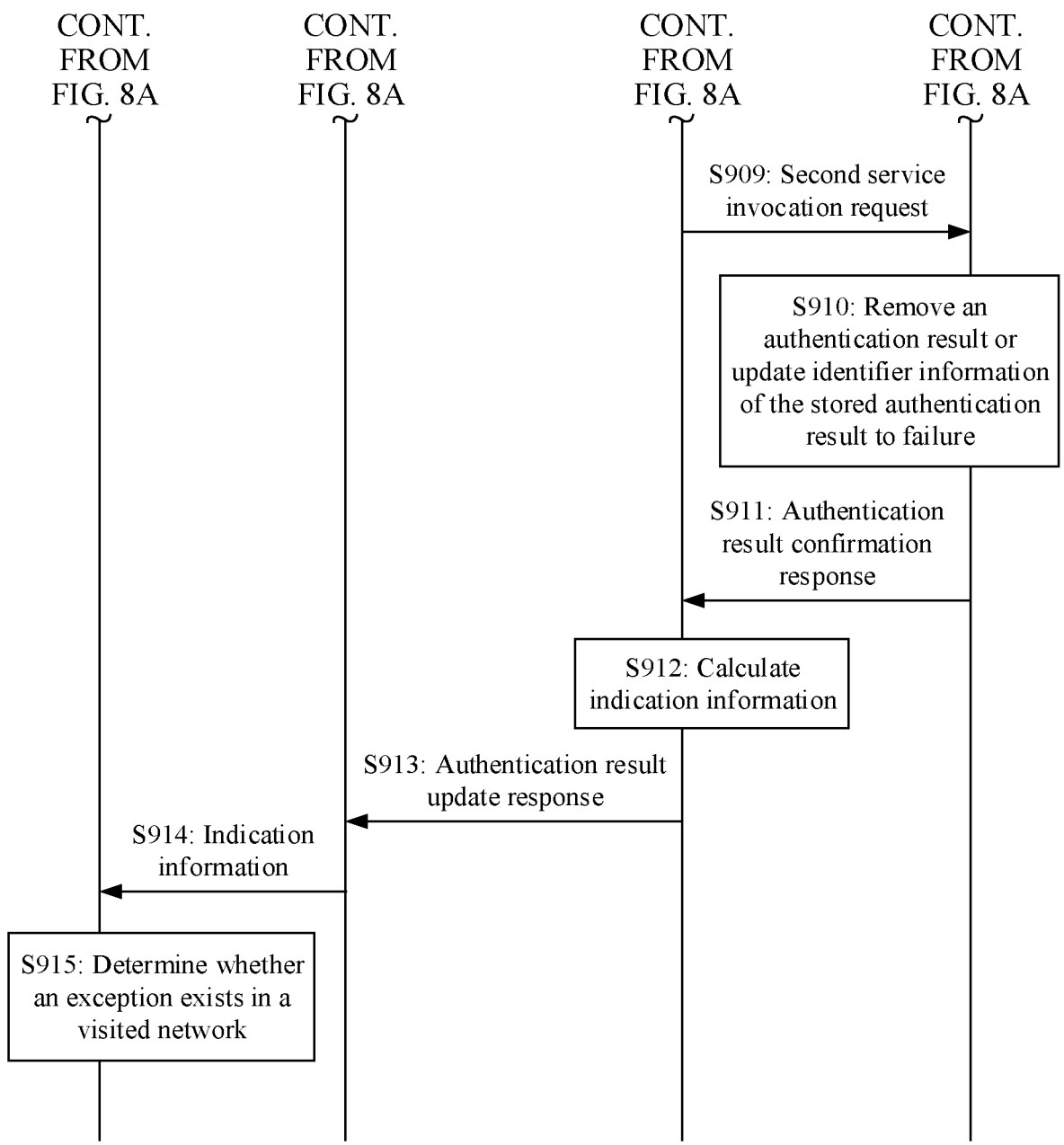

FIG. 8A and FIG. 8B are a schematic flowchart of an authentication result update method 900 according to a still further embodiment of this application. The method 900 includes steps S901 to S915, which are described in detail below.

S901: An AUSF calculates and stores a shared key according to a policy or a configuration.

After an authentication procedure is completed, to prevent a visited network from maliciously tampering with an authentication information update procedure, the AUSF calculates a shared key $K_{cause}$ based on a policy or a local setting of an operator according to formula (1). The shared key is used to protect parameters between a UE and the AUSF.

$$K_{cause}=KDF(Kausf, RAND) \qquad \text{formula (1)}$$

S902: The AUSF sends authentication result update indication information to an AMF.

In some possible implementations, the AUSF in a home network invokes a service to send the policy or indication information indicating some cases in which the UE needs to initiate an authentication result update to the AMF.

Optionally, the service invoked by the AUSF may be an existing service such as an Nausf_UEAuthentication_Authenticate Response, or may be any other newly defined service between the AUSF and the AMF. This is not limited in this embodiment of this application.

S903: The AMF sends an NAS security mode command message to the UE.

The AMF initiates an NAS SMC procedure and sends the NAS security mode command message to the UE. The message includes the policy or indication information indicating some cases in which the UE needs to initiate an authentication result update.

Optionally, the policy or indication information indicating an authentication result update may be an encrypted policy or encrypted indication information. This is not limited in this embodiment of this application.

S904: The UE verifies the security mode command message.

The UE receives the NAS security mode command message sent by the AMF, and verifies the NAS security mode command message. If verification fails, the UE calculates, in a same manner as the AUSF, the shared key $K_{cause}$ based on the policy or indication information received from the AMF, encrypts a cause value Cause of NAS SMC rejection and a serving PLMN ID of the visited network based on $K_{cause}$, and generates first encrypted information Secret according to formula (2):

$$Secret=HMAC(K_{cause}, Cause, Serving\ PLMN\ ID) \qquad \text{formula (2)}.$$

It should be noted that a shared key generation function in this embodiment of this application may not be limited to formula (1), provided that shared key generation functions used in step S901 and step S904 are the same. This is not limited in this embodiment of this application.

It should be noted that a secret generation function in this embodiment of this application may not be limited to formula (2), provided that the cause and the serving PLMN ID are protected using the shared key. This is not limited in this embodiment of this application.

Optionally, if the policy or indication information indicating an authentication result update is encrypted, the UE needs to first perform decryption, and then perform S904 according to the policy or the indication information.

Optionally, the policy or the indication information may be configured on a universal subscriber identity module (USIM) card. This is not limited in this embodiment of this application.

Optionally, after the verification on the NAS SMC message fails, a terminal device may further determine whether a currently rejected NAS connection is a last activated NAS connection. If the currently rejected NAS connection is the last activated NAS connection, an NAS security mode reject message carries authentication result update indication information. The authentication result update indication information is used to indicate that an authentication result of the terminal device in a first serving network needs to be updated.

Alternatively, in some special scenarios (for example, the terminal device is powered off), it has been indicated that there is currently no signaling interaction or service data transmission between the UE and the network. Therefore, the UE may optionally directly include the authentication result update indication information in a first message to be sent to the AMF, without determining whether the currently rejected NAS connection is the last activated NAS connection. Then, the AMF updates the authentication result of the terminal device in the first serving network based on the authentication result update indication information.

S905: The UE sends the first message to the AMF.

After the verification on the NAS SMC message of the terminal device fails, the UE sends the first message to the AMF, where the first message is the NAS security mode reject message, and the message includes Secret.

Optionally, the first message carries first indication information, used to indicate that the AMF needs to decrypt Cause, and further used to indicate whether to send Secret to the AUSF or a UDM for decryption.

Optionally, the NAS security mode reject message may carry indication information used to indicate that Cause needs to be decrypted. For example, the indication information may be a newly defined 5G mobility management cause (5GMM Cause), and the indication information indicates that Cause needs to be decrypted.

In some possible implementations, the indication information may alternatively be a newly defined indication information element (IE), or the first indication information added to an existing IE as an extension.

S906: Optionally, the AMF determines whether the currently rejected NAS connection is the last activated NAS connection.

After receiving the NAS security mode reject message, the AMF optionally determines whether the currently rejected NAS connection is the last activated NAS connection. If the currently rejected NAS connection is the last activated NAS connection, the AMF invokes a service of the AUSF to indicate to initiate an authentication result update.

After receiving the NAS security mode reject message, the AMF may alternatively directly invoke a service of the AUSF to indicate to initiate an authentication result update.

Optionally, if in S904, the UE determines whether the currently rejected NAS connection is the last activated NAS connection after verification on the NAS SMC message fails, S906 may not be performed.

It should be noted that, when it is determined that the currently rejected NAS connection is the last activated NAS connection in S904, the AMF invokes a service of the AUSF based on the authentication result update indication information in the NAS security mode reject message, to indicate to initiate an authentication result update.

In some possible implementations, whether the currently rejected NAS connection is the last activated NAS connection may be determined in both S904 and S906. This is not limited in this embodiment of this application.

Alternatively, in some special scenarios (for example, the terminal device is powered off), it has been indicated that there is currently no signaling interaction or service data transmission between the UE and the network. Therefore, the UE may optionally directly include the authentication result update indication information in a first message to be sent to the AMF, without determining whether the currently rejected NAS connection is the last activated NAS connection. Then, the AMF updates the authentication result of the terminal device in the first serving network based on the authentication result update indication information.

S907: The AMF sends a first service invocation request to the AUSF.

If it is determined in S906 that the currently rejected NAS connection is the last activated NAS connection, the AMF sends the first service invocation request to the AUSF and invokes a service of the AUSF, to indicate the AUSF to initiate an authentication result update.

If it is not determined whether the currently rejected NAS connection is the last activated NAS connection in S904, the AMF invokes a service of the AUSF based on the authentication result update indication information carried in the NAS security mode reject message, to initiate an authentication result update.

For example, the AMF sends an Nausf_UEAuthentication Result Update Request to the AUSF, to indicate the AUSF to initiate an authentication result update. The service is a service used to indicate the AUSF to remove or update an authentication result in the UDM, or mark an authentication result in a corresponding serving network as invalid. A service name is not limited in this embodiment of this application.

The first service invocation request includes identity information of the serving network and identity information of a user. After the authentication procedure is completed, the UDM stores information such as the identity information of the serving network, the identity information of the user, and the authentication result. When the authentication result needs to be updated, the AMF needs to send the identity information of the corresponding serving network and the identity information of the user to the AUSF. The serving network and the user for which the authentication result needs to be updated may be determined based on the identity information of the serving network and the identity information of the user.

For example, the first service invocation request includes a serving PLMN ID and an SUPI. After the authentication procedure is completed, the UDM stores information such as the serving PLMN ID, the SUPI, and the authentication result. When the authentication result needs to be updated, the AMF needs to send the serving PLMN ID of a corresponding serving network and the SUPI to the AUSF. The serving network for which the authentication result needs to be updated may be determined based on the serving PLMN ID and the SUPI.

It should be understood that, in this embodiment of this application, the identity information of the serving network and the identity information of the user are not limited to the serving PLMN ID and the SUPI, provided that the serving network and the user can be uniquely identified.

Optionally, the first service invocation request may further include authentication result update identifier information, for example, false, invalid, or other identifier information.

Optionally, the service request includes Secret.

Optionally, the first service invocation request may further include timestamp information. The information is used for anti-replay, and is used by the UDM to record a time point at which the authentication result is updated.

S908: The AUSF decrypts the first encrypted information using the shared key.

The AUSF receives the authentication result update request sent by the AMF, and obtains Secret included in the request. Then Secret is decrypted based on the stored shared key $K_{cause}$, to obtain the rejection cause value Cause and the identity information (for example, the serving PLMN ID) of the serving network.

S909: The AUSF sends a second service invocation request to the UDM.

S910: The UDM removes the stored authentication result, updates identifier information of the stored authentication result to failure, or marks the authentication result in the corresponding serving network as invalid.

S911: The UDM sends an authentication result confirmation response to the AUSF.

Steps S909 to S911 are the same as steps S209 to S211. For details, refer to the descriptions of S209 to S211. Details are not described herein again.

S912: The AUSF calculates an indication information.

After receiving the authentication result confirmation response sent by the UDM, the AUSF calculates indication information Indication using the shared key $K_{cause}$ according to formula (3):

$$\text{Indication} = \text{HMAC}(K_{cause}, \text{AuthEvent Update result}) \quad \text{formula (3)}.$$

The indication information Indication is used to notify the UE of an update result of the authentication result in the UDM.

It should be noted that the indication generation function in this embodiment of this application may not be limited to formula (3), provided that an AuthEvent Update result is protected using the shared key. This is not limited in this embodiment of this application.

S913: The AUSF sends an authentication result update response to the AMF.

After receiving a service invocation response returned by the UDM, the AUSF calculates the indication information Indication according to formula (3), and sends the authentication result update response to the AMF to indicate an update status of the authentication result. The authentication result update response message includes the indication information Indication.

For example, the AUSF sends an Nausf_UEAuthentication Result Update Response message to the AMF to indicate an update status of the authentication result in the UDM to the AMF.

S914: The AMF sends the indication information to the UE.

The AMF sends the indication information Indication to the UE using a downlink NAS message.

S915: The UE determines whether an exception exists in the visited network.

After the UE receives the downlink NAS message, if the downlink NAS message includes the indication information Indication, and the UE can decrypt Indication using the shared key $K_{cause}$, it indicates that an exception does not exist in the visited network.

Optionally, if the downlink NAS message does not include the indication information Indication, it indicates that an exception exists in the visited network. In this case, the UE immediately terminates the current procedure, and reports an exception to the home network, locally records the exception, reports an alarm to the user, or the like. Related processing is not limited in this embodiment of this application.

In addition, after the UE receives the downlink NAS message, if the downlink NAS message includes the indication information Indication, but the UE cannot decrypt Indication using the shared key $K_{cause}$, it also indicates that an exception exists in the visited network. In this case, the UE immediately terminates the current procedure, and reports the exception to the home network, locally records the exception, reports an alarm to the user, or the like. Related processing is not limited in this embodiment of this application.

In the foregoing technical solution, in an NAS SMC reject scenario, the AUSF and the UE separately calculate the shared key $K_{cause}$ based on Kausf. Then, the UE encrypts a parameter such as Cause and sends an encrypted parameter to the home network, and the AUSF performs decryption and indicates the UDM to remove or update the authentication result. After the AUSF is notified of the update status of the authentication result in the UDM, the AUSF encrypts the authentication event update result to generate indication information Indication, and the AMF sends the Indication to the UE using the downlink NAS message. After the UE receives the downlink NAS message from the AMF, if the message includes Indication, and the UE can decrypt the indication information Indication using $K_{cause}$, a subsequent procedure continues. Otherwise, the UE determines that malicious behavior such as spoofing exists in the visited network. In this case, the UE terminates the current procedure, and reports an exception to the home network, locally records the exception, reports an alarm to the UE, or the like. According to the method in this embodiment, in some procedures actively initiated by the UE, related cause values are not parsed or tampered with by the visited network, and the UE can determine, based on the indication information delivered by the home network, whether a malicious behavior exists in the visited network. This improves network security.

Figure 9A:
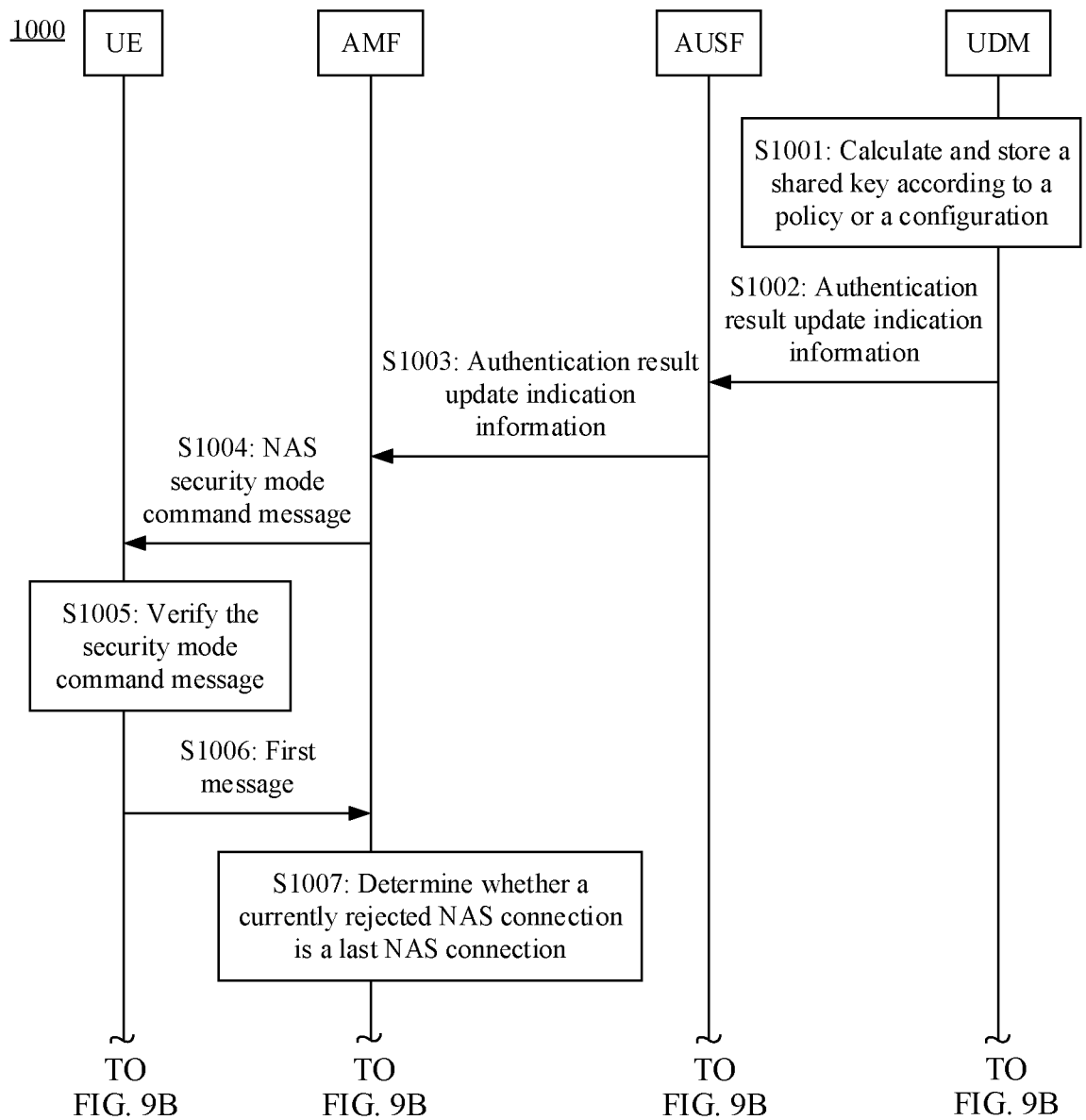
FIG. 9A and FIG. 9B are a schematic flowchart of an authentication result update method according to yet another embodiment of this application.
Figure 9B:
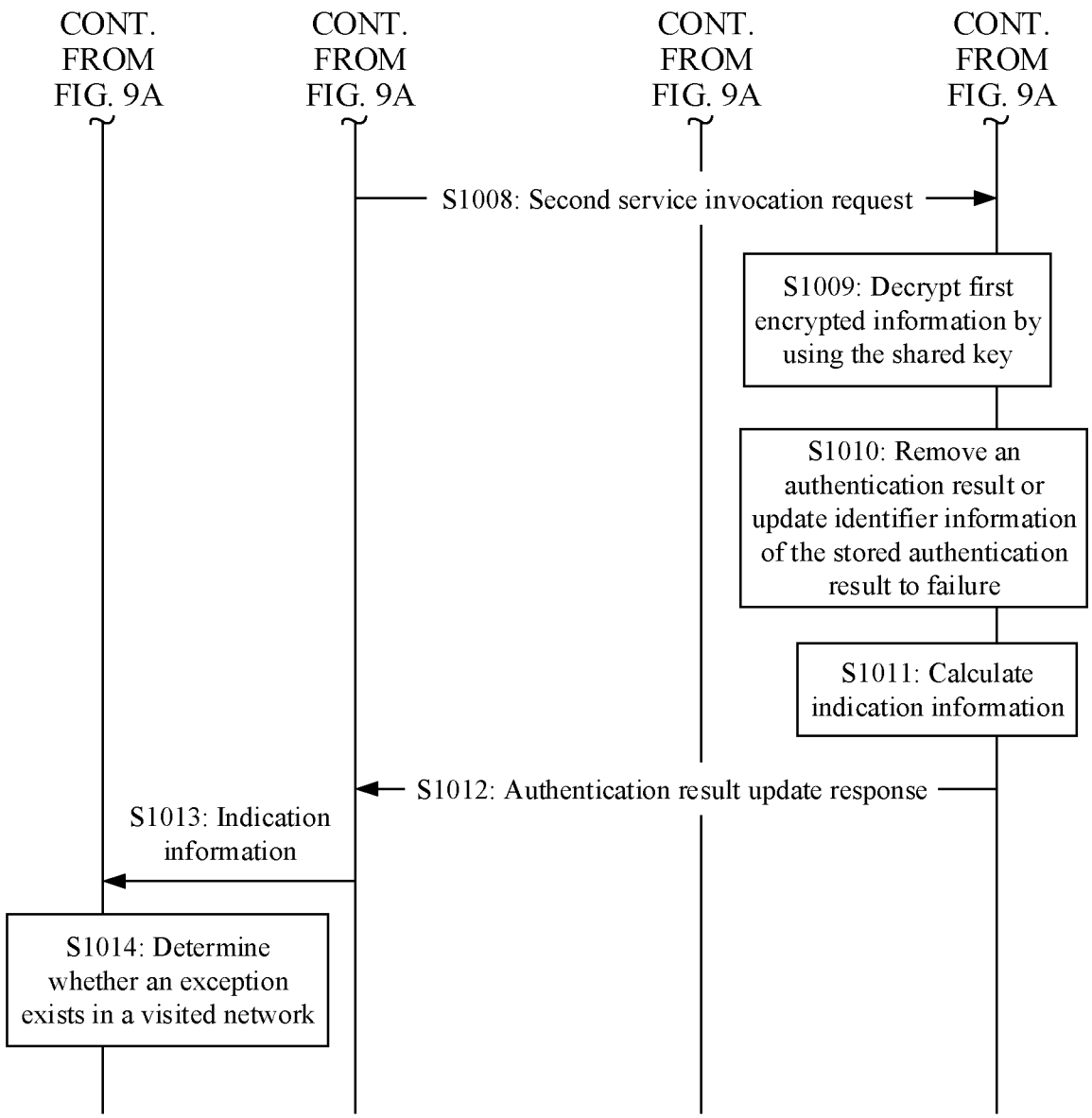

FIG. 9A and FIG. 9B are a schematic diagram of an authentication result update method 1000 according to a yet further embodiment of this application. The method 1000 includes steps S1001 to S1014, which are described in detail below.

S1001: A UDM calculates and stores a shared key according to a policy or a configuration.

After an authentication procedure is completed, to prevent a visited network from maliciously tampering with an authentication information update procedure, the UDM calculates a shared key $K_{cause}$ based on a policy or a local setting of an operator according to formula (1). The shared key is used to protect parameters between a UE and the UDM.

S1002: The UDM sends authentication result update indication information to an AUSF.

The UDM invokes a service to send a policy or indication information indicating some cases in which the UE needs to initiate an authentication result update to the AUSF, to notify the AUSF of the cases in which the authentication result update needs to be initiated.

For example, the UDM uses an Nausf_UEAuthentication_Authenticate Get Response service to send a policy or indication information indicating some cases in which the UE needs to initiate an authentication result update to the AUSF.

It should be noted that the service may be any other newly defined service between the AUSF and the UDM. This is not limited in this embodiment of this application.

S1003: The AUSF sends the authentication result update indication information to an AMF.

After receiving the authentication result update indication information sent by the UDM, the AUSF sends the authentication result update indication information to the AMF by invoking a service.

For example, the AUSF uses an Nausf_UEAuthentication_Authenticate Response service to send the policy or indication information indicating some cases in which the UE needs to initiate an authentication result update to the AMF.

It should be noted that the service may be any other newly defined service between the AUSF and the AMF. This is not limited in this embodiment of this application.

S1004: The AMF sends an NAS security mode command message to the UE.

S1005: The UE verifies the security mode command message.

S1006: The UE sends a first message to the AMF.

S1007: Optionally, the AMF determines whether a currently rejected NAS connection is a last activated NAS connection.

Steps S1004 to S1007 are the same as steps S903 to S906. For descriptions, refer to S903 to S906. Details are not described herein again.

S1008: The AMF sends a second service invocation request to the UDM.

If it is determined in S1007 that the currently rejected NAS connection is the last activated NAS connection, the AMF sends the second service invocation request to the AUSF, and invokes a service of the UDM to indicate the UDM to initiate an authentication result update.

If it is determined whether the currently rejected NAS connection is the last activated NAS connection in S1005, the AMF invokes a service of the UDM based on the authentication result update indication information carried in an NAS security mode reject message, to initiate an authentication result update.

The second service request includes identity information of a serving network and identity information of a user. After the authentication procedure is completed, the UDM stores information such as the identity information of the serving network, the identity information of the user, and the authentication result. When the authentication result needs to be updated, the AMF or the AUSF needs to send the identity information of the corresponding serving network and the identity information of the user to the UDM. The serving network and the user for which the authentication result needs to be updated may be determined based on the identity information of the serving network and the identity information of the user.

For example, the second service invocation request includes a serving PLMN ID and a SUPI, and optionally includes an authentication result update identifier and an access type (for example, 3GPP access and/or non-3GPP access) parameter. The UDM searches, based on the serving PLMN ID and the SUPI that are included in the second service invocation request, the stored authentication result for the corresponding serving network and the user for which the authentication result needs to be updated, and updates the authentication result to failure, marks the authentication result in the corresponding serving network as invalid, or removes the authentication result.

For example, the AMF uses an Nudm_UEAuthentication Result Update Request or a de-registration service to indicate the UDM to initiate an authentication result update. The service is a service used to indicate the UDM to remove or update the authentication result in the UDM, or mark an authentication result in a corresponding serving network as invalid. A service name is not limited in this embodiment of this application.

Optionally, the service request includes Secret.

Optionally, the second service invocation request may further include timestamp information. The information is used for anti-replay, and is used by the UDM to record a time point at which the authentication result is updated.

S1009: The UDM decrypts first encrypted information using the shared key.

The UDM receives the authentication result update request sent by the AMF, and obtains the first encrypted information Secret included in the request. Then, Secret is decrypted based on the stored shared key $K_{cause}$, to obtain a rejection cause value Cause and the identity information (for example, the serving PLMN ID) of the serving network.

S1010: The UDM removes the stored authentication result, updates identifier information of the stored authentication result to failure, or marks the authentication result in the corresponding serving network as invalid.

For example, the UDM removes the authentication result in the corresponding serving network based on the serving PLMN ID and the SUPI in the service request sent by the AMF, updates the authentication result to any other value indicating failure, or marks the authentication result in the corresponding serving network as invalid. This is not limited in this embodiment of this application.

Optionally, the UDM removes or updates the authentication result, or marks the authentication result in the corresponding serving network as invalid, based on the authentication result update identifier in the service request sent by the AMF. For example, the UDM removes or updates the authentication result based on a false value.

Optionally, the UDM may further directly determine, based on the service name, a serving network for which the authentication result needs to be removed or updated, or mark the authentication result in the corresponding serving network as invalid.

Optionally, the second service invocation request includes an access type.

Before that the UDM removes the stored authentication result, updates identifier information of the stored authentication result to failure, or marks the authentication result in the corresponding serving network as invalid, the method further includes: determining whether a user context corresponding to the access type is a target security context, where the target security context is a last user context corresponding to the identity information of the serving network and the identity information of the user.

That the UDM removes the stored authentication result, updates identifier information of the stored authentication result to failure, or marks the authentication result in the corresponding serving network as invalid includes: If the user context corresponding to the access type is the target security context, the UDM removes the stored authentication result, updates the identifier information of the stored authentication result to failure, or marks the authentication result in the corresponding serving network as invalid.

Optionally, the UDM determines whether the user context corresponding to the access type in the second service invocation request is a last user context of the user corresponding to the SUPI in the serving network corresponding to the serving PLMN ID.

For example, after receiving the second service invocation request, the UDM searches for a corresponding user context based on the serving ID and the SUPI in the second service invocation request, for example, obtains (SUPI, serving PLMN ID, 3GPP access, user context) and/or (SUPI, serving PLMN ID, non-3GPP access, user context). Then, the UDM determines whether the user context obtained through searching is the last user context based on the access type parameter. If the obtained context is the last user context, the UDM determines a serving network for which the authentication result needs to be removed or updated, or marks the authentication result in the corresponding serving network as invalid.

Optionally, if the second service invocation request further includes timestamp information, the UDM may store the timestamp to record a time point at which the authentication result is updated.

S1011: The UDM calculates the indication information.

The UDM calculates indication information Indication using the shared key according to formula (3), where the indication information Indication is used to notify $K_{cause}$ the UE of an update result of the authentication result in the UDM.

It should be noted that the indication generation function in this embodiment of this application may not be limited to formula (3), provided that an AuthEvent Update result is protected using the shared key. This is not limited in this embodiment of this application.

S1012: The UDM sends an authentication result update response to the AMF.

After updating the stored authentication result, the UDM sends the authentication result update response to the AMF, indicating an update status of the authentication result. The authentication result update response message includes the indication information Indication.

For example, the UDM sends an Nudm_UEAuthentication_Result Update Response to the AMF, to indicate the update status of the authentication result in the UDM to the AMF.

S1013: The AMF sends the indication information to the UE.

The AMF sends the indication information Indication to the UE using a downlink NAS message.

S1014: The UE determines whether an exception exists in the visited network.

After the UE receives the downlink NAS message, if the downlink NAS message includes the indication information Indication, and the UE can decrypt Indication using the shared key $K_{cause}$, it indicates that an exception does not exist in the visited network.

Optionally, if the downlink NAS message does not include the indication information Indication, it indicates that an exception exists in the visited network. In this case, the UE immediately terminates the current procedure, and reports an exception to a home network, locally records the exception, reports an alarm to the user, or the like. Related processing is not limited in this embodiment of this application.

In addition, after the UE receives the downlink NAS message, if the downlink NAS message includes the indication information Indication, but the UE cannot decrypt Indication using the shared key $K_{cause}$, it also indicates that an exception exists in the visited network. In this case, the UE immediately terminates the current procedure, and reports the exception to the home network, locally records the exception, reports an alarm to the user, or the like. Related processing is not limited in this embodiment of this application.

In the foregoing technical solution, in an NAS SMC reject scenario, the UDM generates the shared key, decrypts a Cause, and generates the indication information Indication. This improves network security and simplifies a process of promptly removing or updating an authentication result in a serving network or marking the authentication result as invalid in the NAS SMC reject scenario.

Figure 10A:
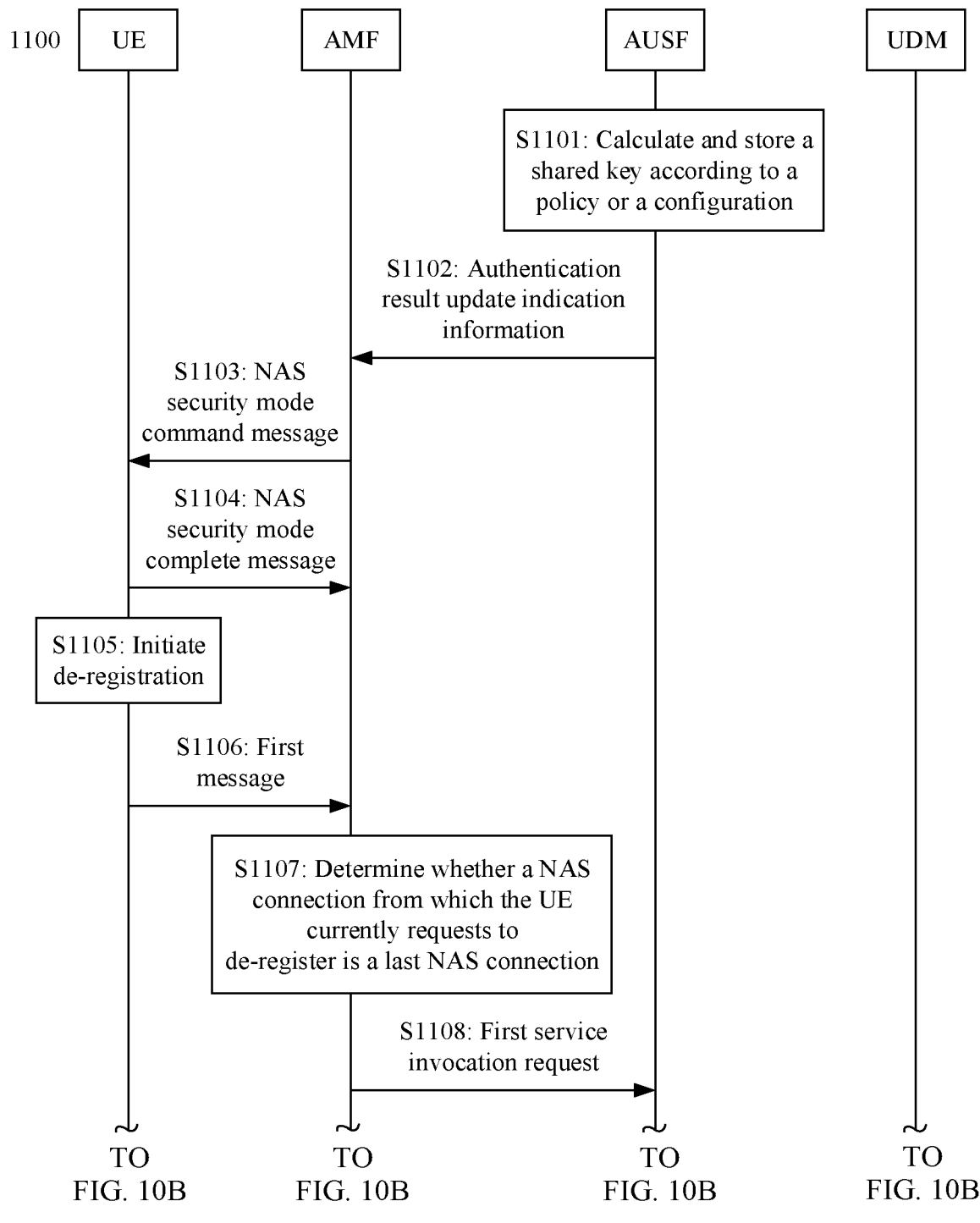
FIG. 10A and FIG. 10B are a schematic flowchart of an authentication result update method according to yet another embodiment of this application.
Figure 10B:
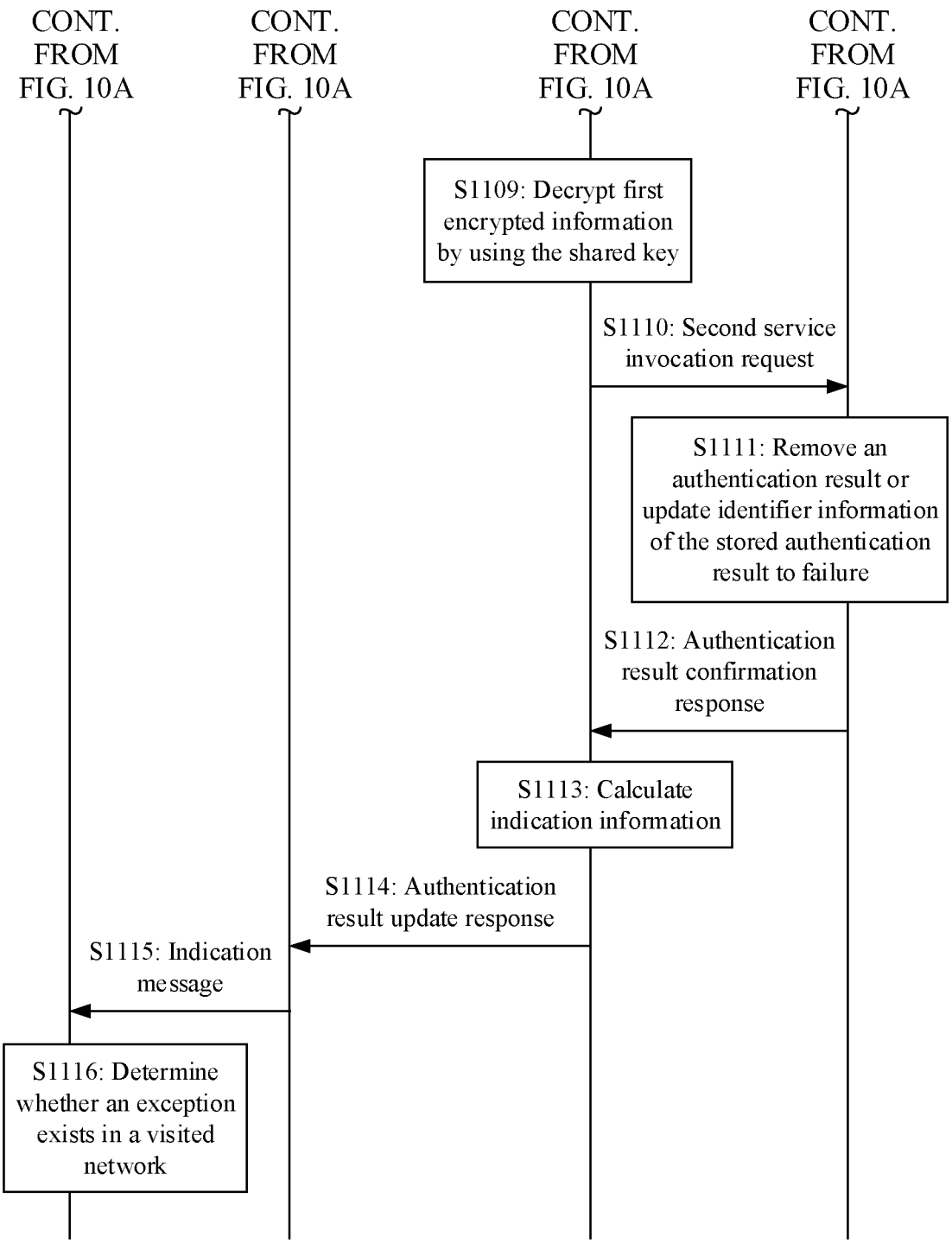

FIG. 10A and FIG. 10B are a schematic flowchart of an authentication result update method 1100 according to a still yet further embodiment of this application. The method 1100 includes steps S1101 to S1116, which are described in detail below.

S1101: An AUSF calculates and stores a shared key according to a policy or a configuration.

S1102: The AUSF sends authentication result update indication information to an AMF.

S1103: The AMF sends an NAS security mode command message to a UE.

Steps S1101 to S1103 are the same as steps S901 to S903. For descriptions, refer to S901 to S903. Details are not described herein again.

S1104: The UE sends an NAS security mode complete message to the AMF.

After receiving the NAS security mode command sent by the AMF, the UE sends the NAS security mode complete message NAS Security Mode Complete message to the AMF as a response to the NAS security mode command message, indicating completion of a security procedure.

S1105: The UE initiates a de-registration procedure.

The UE calculates, in a same manner as the AUSF, the shared key $K_{cause}$ according to a policy or indication information received from the AMF, encrypts an NAS SMC rejection cause value Cause and identity information (for example, a serving PLMN ID) of a visited network based on $K_{cause}$, and generates Secret according to formula (2).

It should be noted that the secret generation function in this embodiment of this application may not be limited to formula (2), provided that the cause and the serving PLMN ID are protected using the shared key. This is not limited in this embodiment of this application.

Optionally, if the policy or indication information indicating an authentication result update is encrypted, the UE needs to first perform decryption, and then perform S1105 according to the policy or the indication information.

S1106: The UE sends a first message to the AMF.

After initiating the de-registration procedure, the UE sends the first message to the AMF, where the first message is a de-registration request message, and the message includes Secret.

For example, the UE sends a De-registration Request message to the AMF. Optionally, the first message carries first indication information, used to indicate that the AMF needs to decrypt Cause, and further used to indicate to whether to send Secret to the AUSF or a UDM for decryption.

Optionally, the de-registration request message may carry indication information used to indicate that Cause needs to be decrypted. For example, the indication information may be a newly defined 5G mobility management cause (5GMM Cause), and the indication information indicates that Cause needs to be decrypted.

In some possible implementations, the indication information may alternatively be a newly defined indication information element (IE), or the first indication information added to an existing IE as an extension.

S1107: Optionally, the AMF determines whether an NAS connection from which the UE currently requests to de-register is a last activated NAS connection.

After receiving the de-registration request message sent by the UE, the AMF may determine whether the NAS connection from which the UE currently requests to de-register is the last activated NAS connection. If the NAS connection is the last activated NAS connection, the AMF invokes a service of the AUSF to indicate to initiate an authentication result update request.

Alternatively, in some special scenarios (for example, a terminal device is powered off), it has been indicated that there is currently no signaling interaction or service data transmission between the UE and a network. Therefore, the UE may optionally directly include the authentication result update indication information in the first message to be sent to the AMF, without determining whether the NAS connection from which the UE currently requests to de-register is the last activated NAS connection. Then, the AMF updates an authentication result of the terminal device in a first serving network based on the authentication result update indication information.

S1108: The AMF sends a first service invocation request to the AUSF.

If it is determined in S1107 that the NAS connection from which the UE currently requests to de-register is the last activated NAS connection, the AMF invokes a service of the AUSF to indicate the AUSF to initiate an authentication result update request.

Alternatively, the AMF directly invokes a service of the AUSF based on a new cause value in the de-registration request message to indicate to initiate an authentication result update request, and sends Secret to the AUSF.

The first service invocation request includes identity information of a serving network and identity information of a user. After an authentication procedure is completed, the UDM stores information such as the identity information of the serving network, the identity information of the user, and an authentication result. When the authentication result needs to be updated, the AMF needs to send the identity information of the corresponding serving network and the identity information of the user to the AUSF. The serving network and the user for which the authentication result needs to be updated may be determined based on the identity information of the serving network and the identity information of the user.

For example, the first service invocation request includes a serving PLMN ID and an SUPI. After the authentication procedure is completed, the UDM stores information such as the serving PLMN ID, the SUPI, and the authentication result. When the authentication result needs to be updated, the AMF needs to send the serving PLMN ID of the corresponding serving network and the SUPI to the AUSF. The serving network for which the authentication result needs to be updated may be determined based on the serving PLMN ID and the SUPI.

It should be understood that, in this embodiment of this application, the identity information of the serving network and the identity information of the user are not limited to the serving PLMN ID and the SUPI, provided that the serving network and the user can be uniquely identified.

Optionally, the first service invocation request may further include authentication result update identifier information, for example, false, invalid, or other identifier information.

For example, the AMF sends an Nausf_UEAuthentication Result Update Request to the AUSF, to indicate the AUSF to initiate an authentication result update. The service is a service used to indicate the AUSF to remove or update the authentication result in the UDM, or mark an authentication result in a corresponding serving network as invalid. A service name is not limited in this embodiment of this application.

Optionally, the first service invocation request may further include timestamp information. The information is used for anti-replay, and is used by the UDM to record a time point at which the authentication result is updated.

S1109: The AUSF decrypts first encrypted information using the shared key.

The AUSF receives the authentication result update request sent by the AMF, and obtains the first encrypted information Secret included in the request. Then, Secret is decrypted based on the stored shared key $K_{cause}$, to obtain the rejection cause value Cause and the identity information (for example, the serving PLMN ID) of the serving network.

S1110: The AUSF sends a second service invocation request to the UDM.

S1111: The UDM removes the stored authentication result, updates identifier information of the stored authentication result to failure, or marks the authentication result in the corresponding serving network as invalid.

S1112: The UDM sends an authentication result confirmation response to the AUSF.

Steps S1110 to S1112 are the same as steps S209 to S211. For details, refer to the descriptions of S209 to S211. Details are not described herein again.

S1113: The AUSF calculates the indication information.

After receiving the authentication result confirmation response sent by the UDM, the AUSF calculates indication information Indication using the shared key $K_{cause}$ according to formula (3), where the indication information Indication is used to notify the UE of an update result of the authentication result on the UDM.

It should be noted that the indication generation function in this embodiment of this application may not be limited to formula (3), provided that an AuthEvent Update result is protected using the shared key. This is not limited in this embodiment of this application.

S1114: The AUSF sends an authentication result update response to the AMF.

After receiving a service invocation response returned by the UDM, the AUSF calculates the indication information Indication according to formula (3), and sends the authentication result update response to the AMF to indicate an update status of the authentication result. The authentication result update response message includes the indication information Indication.

For example, the AUSF sends an Nausf_UEAuthentication Result Update Response message to the AMF, to indicate an update status of the authentication result in the UDM to the AMF.

S1115: The AMF sends the indication message to the UE.

For example, the AMF sends the indication information Indication to the UE using a De-registration Response.

S1116: The UE determines whether an exception exists in the visited network.

After the UE receives the de-registration response message, if the de-registration response message includes the indication information Indication, and the UE can decrypt Indication using the shared key $K_{cause}$, it indicates that an exception does not exist in the visited network.

Optionally, if the downlink NAS message does not include the indication information Indication, it indicates that an exception exists in the visited network. In this case, the UE immediately terminates the current procedure, and reports an exception to a home network, locally records the exception, reports an alarm to the user, or the like. Related processing is not limited in this embodiment of this application.

In addition, after the UE receives the downlink NAS message, if the downlink NAS message includes the indication information Indication, but the UE cannot decrypt Indication using the shared key $K_{cause}$, it also indicates that an exception exists in the visited network. In this case, the UE immediately terminates the current procedure, and reports the exception to the home network, locally records the exception, reports an alarm to the user, or the like. Related processing is not limited in this embodiment of this application.

According to the method in this embodiment, in the de-registration procedure actively initiated by the UE, a related cause value is not parsed and tampered with by the visited network. In addition, the UE can determine whether a malicious behavior exists in the visited network based on the indication information delivered by the home network. For example, in the de-registration procedure initiated by the UE, if the indication is not received from the network side, the UE determines that the visited network may not report the cause value to the home network, and the home network does not update the authentication result; if the UE finally receives the indication from the network side but cannot decrypt the indication, the UE determines that the visited network may have tampered with the indication. Therefore, network security is improved.

Figure 11A:
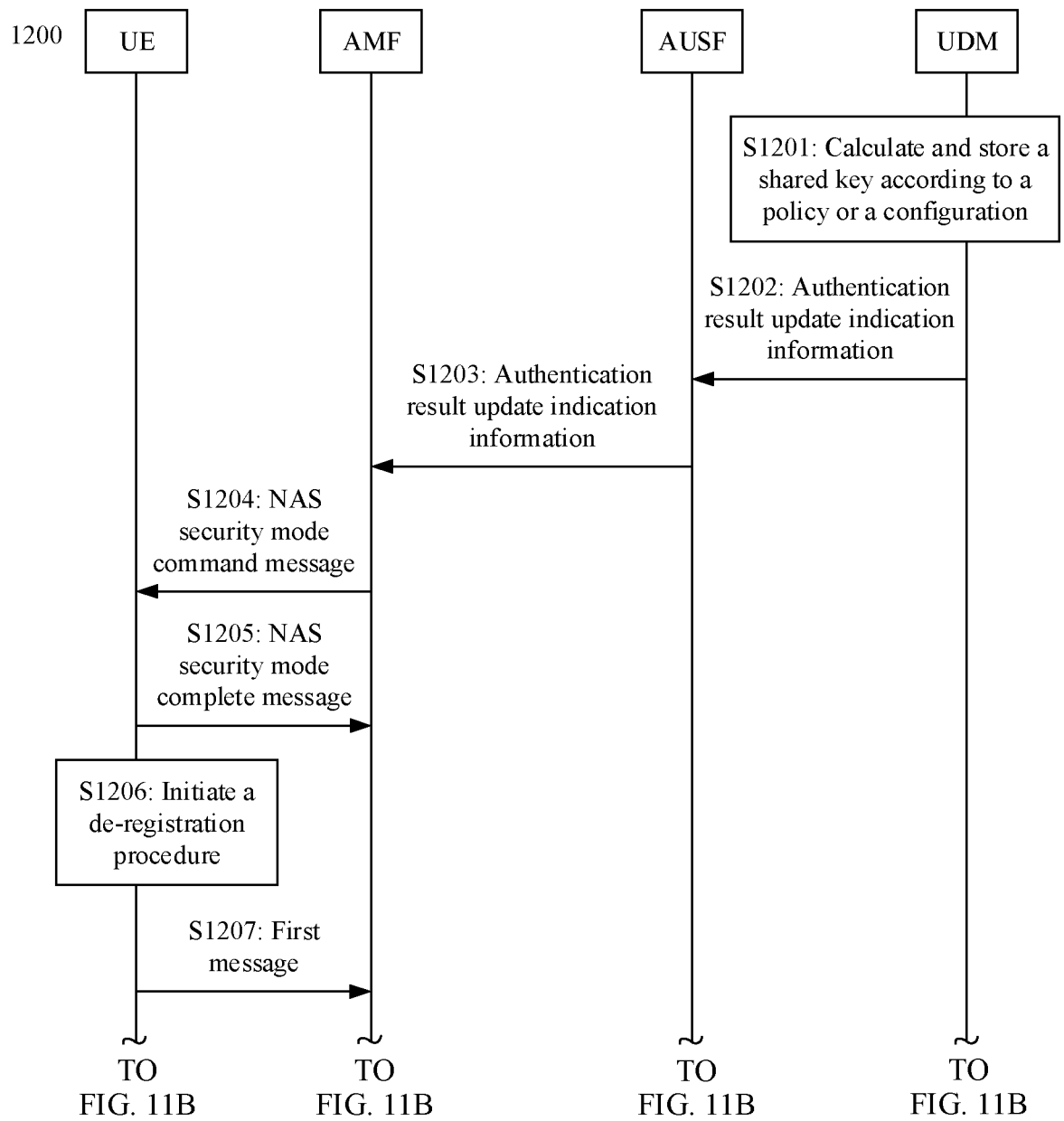
FIG. 11A and FIG. 11B are a schematic flowchart of an authentication result update method according to yet another embodiment of this application.
Figure 11B:
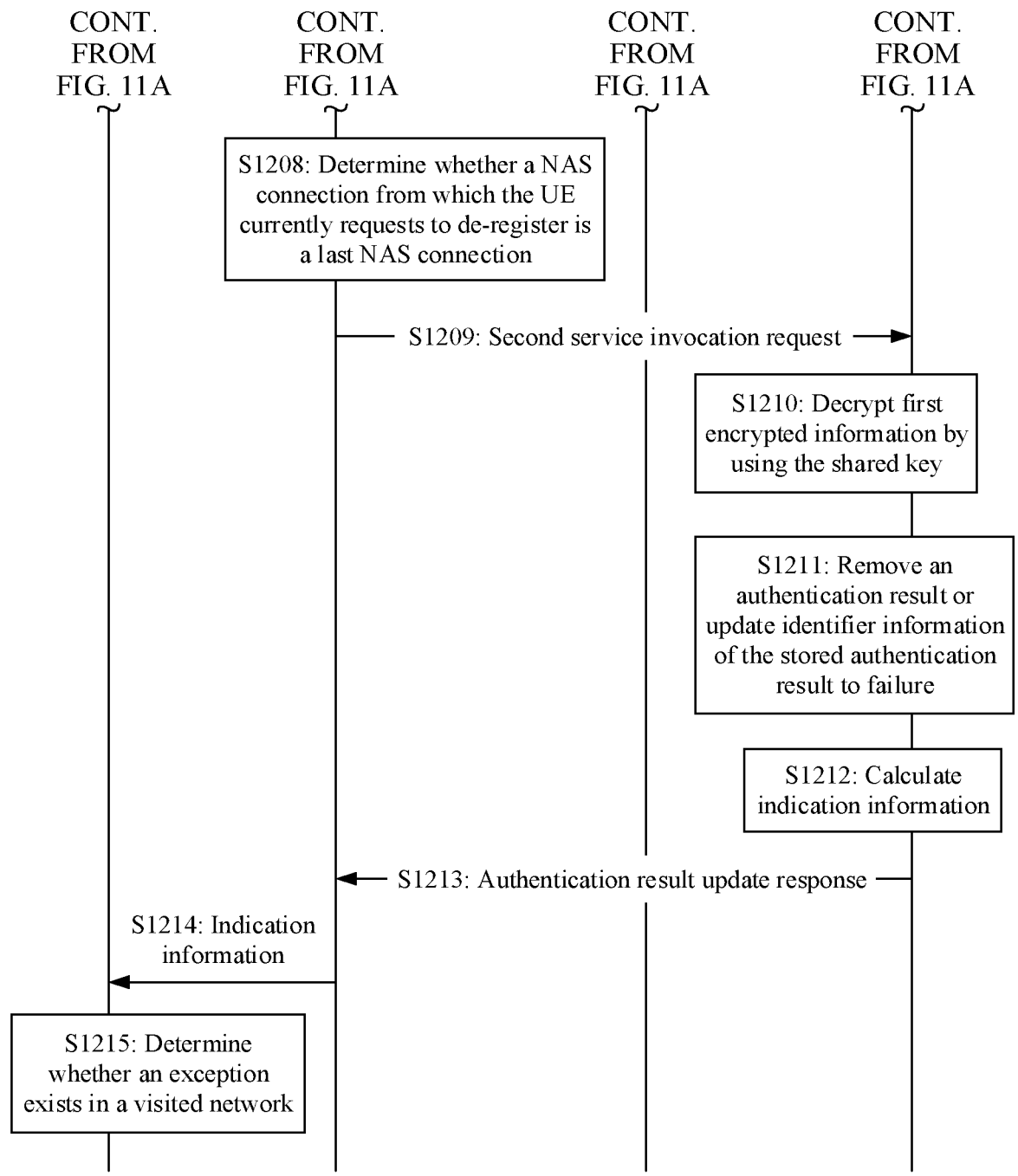

FIG. 11A and FIG. 11B are a schematic flowchart of an authentication result update method 1200 according to even yet another embodiment of this application. The method 1200 includes steps S1201 to S1215, which are described in detail below.

S1201: A UDM calculates and stores a shared key according to a policy or a configuration.

After an authentication procedure is completed, to prevent a visited network from maliciously tampering with an authentication information update procedure, the UDM calculates a shared key $K_{cause}$ based on a policy or a local setting of an operator according to formula (1). The shared key is used to protect parameters between a UE and an AUSF.

S1202: The UDM sends authentication result update indication information to an AUSF.

The UDM invokes a service to send a policy or indication information indicating some cases in which the UE needs to initiate an authentication result update to the AUSF, to notify the AUSF of the cases in which the authentication result update needs to be initiated.

For example, the UDM uses an Nausf_UEAuthentication_Authenticate Get Response service to send a policy or indication information indicating some cases in which the UE needs to initiate an authentication result update to the AUSF.

It should be noted that the service may be any other newly defined service between the AUSF and the UDM. This is not limited in this embodiment of this application.

S1203: The AUSF sends authentication result update indication information to an AMF.

After receiving the authentication result update indication information sent by the UDM, the AUSF sends the authentication result update indication information to the AMF by invoking a service.

For example, the AUSF uses an Nausf_UEAuthentication_Authenticate Response service to send the policy or indication information indicating some cases in which the UE needs to initiate an authentication result update to the AMF.

It should be noted that the service may be any other newly defined service between the AUSF and the AMF. This is not limited in this embodiment of this application.

S1204: The AMF sends an NAS security mode command message to the UE.

S1205: The UE sends an NAS security mode complete message to the AMF.

After receiving the NAS security mode command sent by the AMF, the UE sends the NAS security mode complete message NAS Security Mode Complete message to the AMF as a response to the NAS security mode command message, indicating completion of a security procedure.

S1206: The UE initiates a de-registration procedure.

The UE calculates, in a same manner as the UDM, the shared key $K_{cause}$ according to a policy or indication information received from the AMF, encrypts an NAS SMC rejection cause value Cause and identity information (for example, a serving PLMN ID) of a visited network based on $K_{cause}$, and generates Secret according to formula (2).

S1207: The UE sends a first message to the AMF.

The first message is a de-registration request message. For example, the UE sends a De-registration Request message to the AMF, where the message includes Secret and indication information New Cause indicating that the AMF needs to send Secret to the UDM.

S1208: Optionally, the AMF determines whether an NAS connection from which the UE currently requests to de-register is a last activated NAS connection.

After receiving the de-registration request message sent by the UE, the AMF may determine whether the NAS connection from which the UE currently requests to de-register is the last activated NAS connection. If the NAS connection is the last activated NAS connection, the AMF invokes a service of the AUSF to indicate to initiate an authentication result update request.

Alternatively, in some special scenarios (for example, a terminal device is powered off), it has been indicated that there is currently no signaling interaction or service data transmission between the UE and a network. Therefore, the UE may optionally directly include the authentication result update indication information in the first message to be sent to the AMF, without determining whether the NAS connection from which the UE currently requests to de-register is the last activated NAS connection. Then, the AMF updates an authentication result of the terminal device in a first serving network based on the authentication result update indication information.

S1209: The AMF sends a second service invocation request to the UDM.

If it is determined in S1208 that the NAS connection from which the UE currently requests to de-register is the last activated NAS connection, the AMF invokes a service of the UDM to indicate the UDM to initiate an authentication result update request.

Alternatively, the AMF directly invokes a service of the UDM based on New Cause in the de-registration request message to indicate to initiate an authentication result update request, and sends Secret to the UDM.

The second service request includes identity information of a serving network and identity information of a user. After the authentication procedure is completed, the UDM stores information such as the identity information of the serving network, the identity information of the user, and the authentication result. When the authentication result needs to be updated, the AMF or the AUSF needs to send the identity information of the corresponding serving network and the identity information of the user to the UDM. The serving network and the user for which the authentication result needs to be updated may be determined based on the identity information of the serving network and the identity information of the user.

For example, the second service invocation request includes a serving PLMN ID and a SUPI, and optionally includes an authentication result update identifier and an access type (for example, 3GPP access and/or non-3GPP access) parameter. The UDM searches, based on the serving PLMN ID and the SUPI that are included in the second service invocation request, the stored authentication result for the corresponding serving network and the user for which the authentication result needs to be updated, and updates the authentication result to failure, marks the authentication result in the corresponding serving network as invalid, or removes the authentication result.

For example, the AMF uses an Nudm_UEAuthentication Result Update Request service or a de-registration service to indicate the UDM to initiate an authentication result update. The service is a service used to indicate the UDM to remove or update the authentication result in the UDM, or mark an authentication result in a corresponding serving network as invalid. A service name is not limited in this embodiment of this application.

Optionally, the second service invocation request may further include timestamp information. The information is used for anti-replay, and is used by the UDM to record a time point at which the authentication result is updated.

S1210: The UDM decrypts first encrypted information using the shared key.

The UDM receives the authentication result update request sent by the AMF, and obtains the first encrypted information Secret included in the request. Then, Secret is decrypted based on the stored shared key $K_{cause}$, to obtain the rejection cause value Cause and the identity information (for example, the serving PLMN ID) of the serving network.

S1211: The UDM removes the stored authentication result, updates identifier information of the stored authentication result to failure, or marks the authentication result in the corresponding serving network as invalid.

For example, the UDM removes the authentication result in the corresponding serving network based on the Serving PLMN ID and the SUPI in the service request sent by the AMF, marks the authentication result in the corresponding serving network as invalid, or updates the authentication result to any other value indicating failure. This is not limited in this embodiment of this application.

Optionally, the UDM removes or updates the authentication result, or marks the authentication result in the corresponding serving network as invalid, based on the authentication result update identifier in the service request sent by the AMF. For example, the UDM removes or updates the authentication result based on a false value.

Optionally, the UDM may further directly determine, based on a service name, a serving network for which the authentication result needs to be removed or updated.

Optionally, the UDM determines whether a user context corresponding to the access type in the second service invocation request is a last user context of the user corresponding to the SUPI in the serving network corresponding to the serving PLMN ID.

For example, after receiving the second service invocation request, the UDM searches for a corresponding user context based on the serving ID and the SUPI in the second service invocation request, for example, obtains (SUPI, serving PLMN ID, 3GPP access, user context) and/or (SUPI, serving PLMN ID, non-3GPP access, user context). Then, the UDM determines whether the user context obtained through searching is the last user context based on the access type parameter. If the obtained context is the last user context, the UDM determines a serving network for which the authentication result needs to be removed or updated, or marks the authentication result in the corresponding serving network as invalid.

Optionally, if the second service invocation request further includes timestamp information, the UDM may store the timestamp to record a time point at which the authentication result is updated.

S1212: The UDM calculates the indication information.

The UDM calculates indication information Indication using the shared key according to formula (3), where the indication information Indication is used to notify $K_{cause}$ the UE of an update result of the authentication result in the UDM.

It should be noted that the indication generation function in this embodiment of this application may not be limited to formula (3), provided that an AuthEvent Update result is protected using the shared key. This is not limited in this embodiment of this application.

S1213: The UDM sends an authentication result update response to the AMF.

After updating the stored authentication result, the UDM sends the authentication result update response to the AMF, indicating an update status of the authentication result. The authentication result update response message includes the indication information Indication.

For example, the UDM sends an Nudm_UEAuthentication_Result Update Response to the AMF, to indicate the update status of the authentication result in the UDM to the AMF.

S1214: The AMF sends the indication information to the UE.

For example, the AMF sends the indication information Indication to the UE using a De-registration Response.

S1215: The UE determines whether an exception exists in the visited network.

After the UE receives the de-registration response message, if the de-registration response message includes the indication information Indication, and the UE can decrypt Indication using the shared key $K_{cause}$, it indicates that an exception does not exist in the visited network.

Optionally, if the downlink NAS message does not include the indication information Indication, it indicates that an exception exists in the visited network. In this case, the UE immediately terminates the current procedure, and reports an exception to a home network, locally records the exception, reports an alarm to the user, or the like. Related processing is not limited in this embodiment of this application.

In addition, after the UE receives the downlink NAS message, if the downlink NAS message includes the indication information Indication, but the UE cannot decrypt Indication using the shared key $K_{cause}$, it also indicates that an exception exists in the visited network. In this case, the UE immediately terminates the current procedure, and reports the exception to the home network, locally records the exception, reports an alarm to the user, or the like. Related processing is not limited in this embodiment of this application.

In the foregoing technical solution, in a scenario in which the UE actively initiates the de-registration procedure, the UDM generates the shared key, decrypts the cause, and generates the indication information Indication. This improves network security and simplifies a process of promptly removing or updating an authentication result in a serving network in the de-registration scenario.

It should be further understood that the foregoing descriptions are merely intended to help a person skilled in the art better understand the embodiments of this application, but are not intended to limit the scope of the embodiments of this application. A person skilled in the art certainly can make, based on the examples given above, various equivalent modifications or variations, or combine any two or more of the foregoing embodiments. Such a modified, changed, or combined solution also falls within the scope of the embodiments of this application.

It should be further understood that, the foregoing descriptions of the embodiments of this application focus on a difference between the embodiments. For same or similar parts that are not mentioned, reference may be made to each other. For brevity, details are not described herein again.

It should be further understood that sequence numbers of the foregoing processes do not mean execution sequences. The execution sequences of the processes should be determined based on functions and internal logic of the processes, and should not constitute any limitation on implementation processes of the embodiments of this application.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail an example of the data transmission method provided in this application. It can be understood that, to implement the foregoing functions, a communications apparatus includes a corresponding hardware structure and/or software module for performing the functions. A person skilled in the art should be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The following describes a communications apparatus according to this application.

Figure 12:
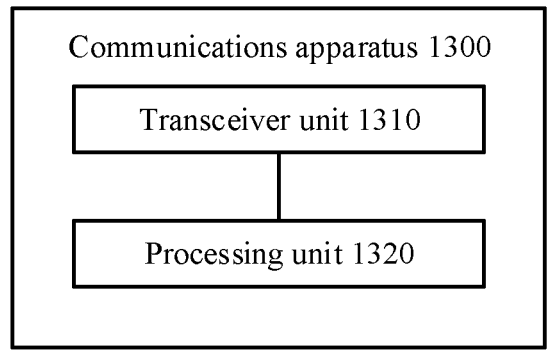
FIG. 12 is a schematic structural diagram of a communications apparatus according to an embodiment of this application.

FIG. 12 is a schematic diagram of a communications apparatus 1300 according to an embodiment of this application. It should be understood that the communications apparatus 1300 shown in FIG. 12 is merely an example. The communications apparatus 1300 in this embodiment of this application may further include other modules or units, may include modules having functions similar to those of modules in FIG. 12, or may not necessarily include all modules in FIG. 12. As shown in FIG. 12, the communications apparatus 1300 includes a transceiver unit 1310 and a processing unit 1320.

In some possible implementations, the communications apparatus 1300 may be an AMF.

The processing unit 1320 is configured to determine that an authentication result of a terminal device in a first serving network needs to be updated.

The transceiver unit 1310 is configured to send a first service invocation request to an authentication server, where the first service invocation request is used to request to update the authentication result stored in a unified data management device.

After determining that the authentication result of the terminal device needs to be updated, the core access and mobility management function device in this embodiment of this application sends the first service invocation request to the authentication server, where the first service invocation request is used to request to update the authentication result stored in the unified data management device. In this way, the authentication result in the serving network can be removed, updated, or marked as invalid in a timely manner. This effectively prevents visited network spoofing and a DoS attack, and improves network security.

Optionally, the processing unit 1320 is further configured to: when receiving a security mode reject message from the terminal device, determine that the authentication result of the terminal device in the first serving network needs to be updated.

After verification on an NAS SMC message fails, a UE sends a first message to the AMF, where the first message is an NAS security mode reject message.

Optionally, the security mode reject message includes authentication result update indication information, and the authentication result update indication information is used to indicate that the authentication result of the terminal device in the first serving network needs to be updated.

Optionally, after the verification on the NAS SMC message fails, the UE may further determine whether a currently rejected NAS connection is a last activated NAS connection. If the currently rejected NAS connection is the last activated NAS connection, the UE includes one piece of authentication result update indication information in the NAS security mode reject message, where the authentication result update indication information is used to indicate that the authentication result of the terminal device in the first serving network needs to be updated.

Alternatively, in some special scenarios (for example, the terminal device is powered off), it has been indicated that there is currently no signaling interaction or service data transmission between the UE and a network. Therefore, the UE may optionally directly include the authentication result update indication information in the first message to be sent to the AMF, without determining whether the currently rejected NAS connection is the last activated NAS connection. Then, the AMF updates the authentication result of the terminal device in the first serving network based on the authentication result update indication information.

Optionally, the processing unit 1320 is further configured to: when receiving a de-registration request message from the terminal device, determine that the authentication result of the terminal device in the first serving network needs to be updated.

After the UE initiates a de-registration procedure, the UE sends the first message to the AMF, where the first message is a de-registration request message, for example, a De-registration Request.

Optionally, when the AMF initiates explicit de-registration, the transceiver unit 1310 is further configured to send the de-registration request message to the terminal device.

Optionally, the transceiver unit 1310 is further configured to receive a de-registration request message from the terminal device, where the de-registration request message includes authentication result update indication information, and the authentication result update indication information is used to indicate that an authentication result of the terminal device in the first serving network needs to be updated.

For example, when initiating the de-registration procedure, the UE may further determine whether an NAS connection from which the UE currently requests to de-register is a last activated NAS connection. If the NAS connection from which the UE currently requests to de-register is the last activated NAS connection, in S505, the de-registration request message sent by the UE to the AMF carries the authentication result update indication information. The authentication result update indication information is used to indicate that the authentication result of the terminal device in the first serving network needs to be updated.

Alternatively, in some special scenarios (for example, the terminal device is powered off), it has been indicated that there is currently no signaling interaction or service data transmission between the UE and a network. Therefore, the UE may optionally directly include the authentication result update indication information in the first message to be sent to the AMF, without determining whether the NAS connection from which the UE currently requests to de-register is the last activated NAS connection. Then, the AMF updates the authentication result of the terminal device in the first serving network based on the authentication result update indication information.

Optionally, the first service invocation request message includes identity information of the serving network and identity information of a user.

The first service request includes the identity information of the serving network and the identity information of the user. After an authentication procedure is completed, a UDM stores information such as the identity information of the serving network, the identity information of the user, and an authentication result. When the authentication result needs to be updated, the AMF needs to send the identity information of the corresponding serving network and the identity information of the user to an AUSF. The serving network and the user for which the authentication result needs to be updated may be determined based on the identity information of the serving network and the identity information of the user.

For example, the first service request includes a serving PLMN ID and a SUPI. After the authentication procedure is completed, the UDM stores information such as the serving PLMN ID, the SUPI, and the authentication result. When the authentication result needs to be updated, the AMF needs to send the serving PLMN ID of the corresponding serving network and the SUPI to the AUSF. The serving network for which the authentication result needs to be updated may be determined based on the serving PLMN ID and the SUPI.

It should be understood that, in this embodiment of this application, the identity information of the serving network and the identity information of the user are not limited to the serving PLMN ID and the SUPI, provided that the serving network and the user can be uniquely identified.

In the foregoing technical solution, in an NAS SMC reject scenario or a de-registration scenario, the AMF invokes a service of the AUSF, and the AUSF invokes a service of the UDM, to indicate the UDM to remove or update an authentication result corresponding to a serving network. In this way, the authentication result in the serving network can be removed, updated, or marked as invalid in a timely manner. This effectively prevents visited network spoofing and a DoS attack, and improves network security.

Alternatively, the AMF directly sends a second service invocation request to the UDM. This effectively prevents visited network spoofing and a DoS attack, and simplifies a process of promptly removing or updating an authentication result in a serving network or marking the authentication result as invalid.

Figure 13:
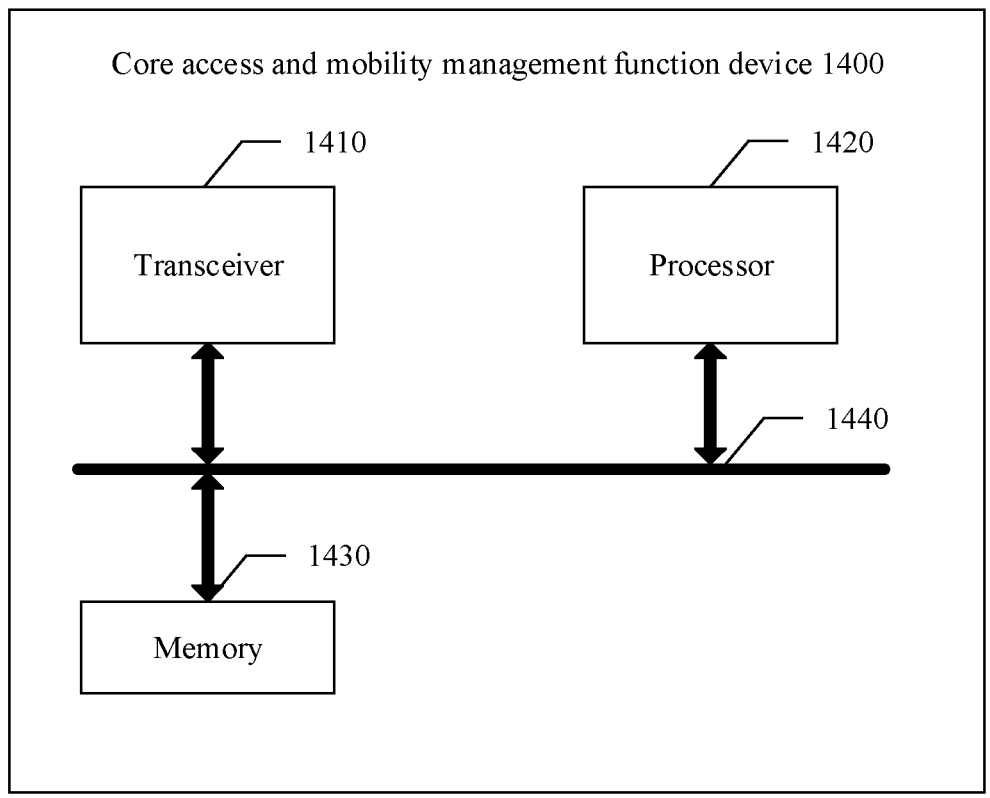
FIG. 13 is a schematic structural diagram of a core access and mobility management function device according to an embodiment of this application.

FIG. 13 shows a communications apparatus 1400 according to an embodiment of this application. The communications apparatus 1400 is configured to implement a function of an AMF in the foregoing method. The communications apparatus 1400 may be a chip system. In this embodiment of this application, the chip system may include a chip, or may include a chip and another discrete component. The communications apparatus 1400 includes a processor 1420 configured to implement the function of the AMF in the method provided in the embodiments of this application.

The communications apparatus 1400 may further include a memory 1430 configured to store program instructions and/or data. The memory 1430 is coupled to the processor 1420. The processor 1420 may cooperate with the memory 1430. The processor 1420 may execute the program instructions stored in the memory 1430.

The communications apparatus 1400 may further include a transceiver 1410 (which may be replaced with a receiver and a transmitter, and the receiver implements a receiving function) configured to communicate with another device using a transmission medium, such that an apparatus in the communications apparatus 1400 may communicate with the other device. The processor 1420 sends and receives signaling through the transceiver 1410, and is configured to implement the method performed by the AMF in the method embodiments of this application.

A specific connection medium between the transceiver 1410, the processor 1420, and the memory 1430 is not limited in this embodiment of this application. In this embodiment of this application, the memory 1430, the processor 1420, and the transceiver 1410 are connected using a bus 1440 in FIG. 13. The bus 1440 is represented using a thick line in FIG. 13. A manner of connecting other components is merely an example for description, and is not limited thereto. The bus 1440 may be classified into an address bus, a data bus, a control bus, and the like. For ease of representation, only one thick line is used to represent the bus 1440 in FIG. 13, but this does not mean that there is only one bus or only one type of bus.

Figure 14:
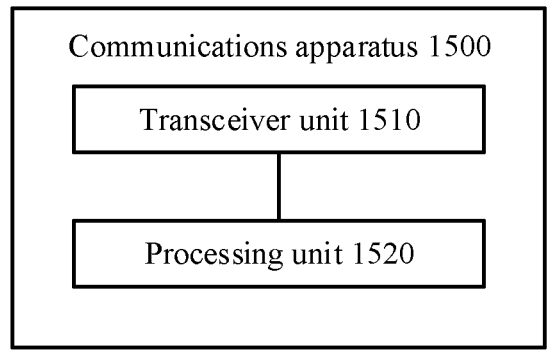
FIG. 14 is a schematic structural diagram of a communications apparatus according to another embodiment of this application.

FIG. 14 is a schematic block diagram of a communications apparatus 1500 according to another embodiment of this application. It should be understood that the communications apparatus 1500 shown in FIG. 14 is merely an example. The communications apparatus 1500 in this embodiment of this application may further include other modules or units, may include modules having functions similar to those of modules in FIG. 14, or may not necessarily include all modules in FIG. 14. As shown in FIG. 14, the communications apparatus 1500 includes a transceiver unit 1510 and a processing unit 1520.

In some possible implementations, the communications apparatus 1500 may be a UDM.

The transceiver unit 1510 is configured to receive a second service invocation request, where the second service invocation request is used to update an authentication result stored in a unified data management device.

The processing unit 1520 is configured to update, based on the second service invocation request, the authentication result stored in the unified data management device.

In the foregoing technical solution, in a procedure after authentication is completed, a service of the UDM is invoked to indicate the UDM to remove or update an authentication result or mark an authentication result in a corresponding serving network as invalid, such that the authentication result in the serving network is removed or updated in a timely manner. This effectively prevents visited network spoofing and a DoS attack and improves network security.

Optionally, the second service invocation request includes identity information of a serving network and identity information of a user, and optionally includes authentication failure identifier information and an access type parameter.

After an authentication procedure is completed, the UDM stores information such as the identity information of the serving network, the identity information of the user, and the authentication result. When the authentication result needs to be updated, an AMF or an AUSF needs to send the identity information of the corresponding serving network and the identity information of the user to the UDM. The serving network and the user for which the authentication result needs to be updated may be determined based on the identity information of the serving network and the identity information of the user.

For example, the second service invocation request includes a serving PLMN ID and an SUPI, and optionally includes an authentication result update identifier and an access type parameter. The UDM searches, based on the serving PLMN ID and the SUPI that are included in the second service invocation request, the stored authentication result for the corresponding serving network and the user for which the authentication result needs to be updated, and updates the authentication result to failure, marks the authentication result in the corresponding serving network as invalid, or removes the authentication result.

Optionally, the second service invocation request may alternatively be an existing terminal device authentication result confirmation (Nudm_UEAuthentuication_Result Confirmation) service or a de-registration service that is sent through a UDM interface. The authentication result update identifier may be false, invalid, or another value indicating failure. This is not limited in this embodiment of this application.

Optionally, the transceiver unit 1510 is further configured to receive the second service invocation request message sent by the AMF.

Optionally, the second service invocation request may further include timestamp information. The information is used for anti-replay, and is used by the UDM to record a time point at which the authentication result is updated.

The AMF directly sends the second service invocation request to the UDM. This effectively prevents visited network spoofing and a DoS attack, and simplifies a process of promptly removing or updating an authentication result in a serving network.

Optionally, the processing unit 1520 is further configured to remove the corresponding authentication result based on the identity information of the serving network and the identity information of the user; or update, based on the authentication failure identifier information, the authentication result stored in the unified data management device to authentication failure, or mark the authentication result in the corresponding serving network as invalid.

Figure 15:
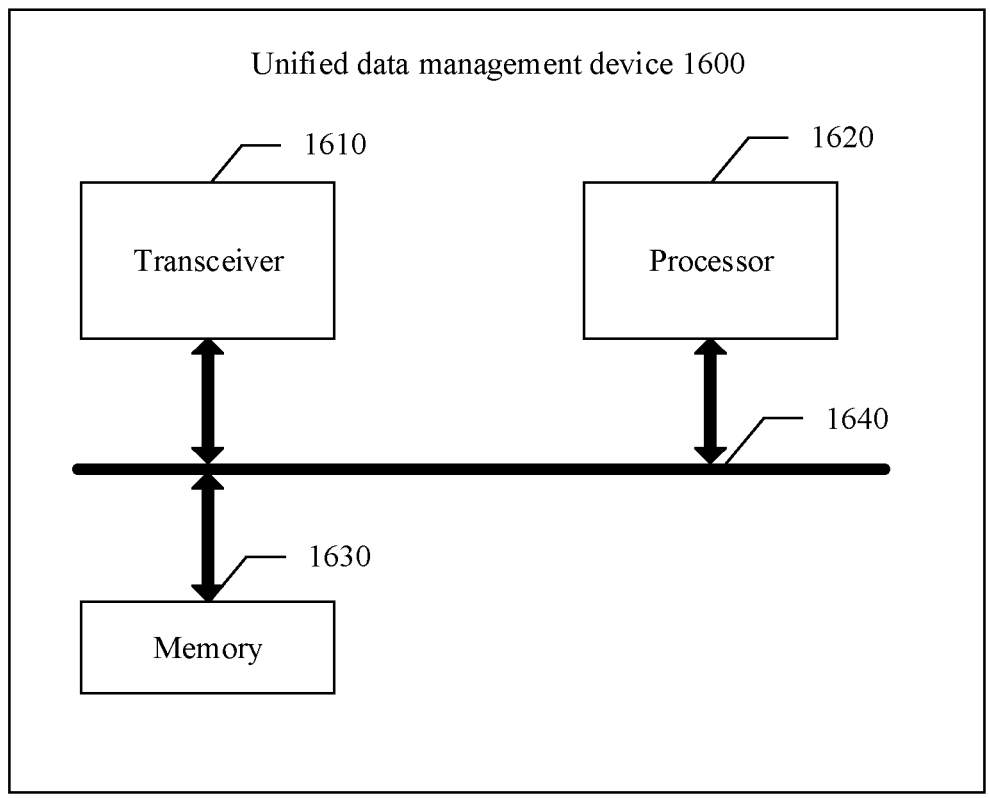
FIG. 15 is a schematic structural diagram of a unified data management device according to another embodiment of this application.

FIG. 15 shows a communications apparatus 1600 according to an embodiment of this application. The communications apparatus 1600 is configured to implement a function of a UDM in the foregoing method. The communications apparatus 1600 may be a chip system. In this embodiment of this application, the chip system may include a chip, or may include a chip and another discrete component. The communications apparatus 1600 includes a processor 1620 configured to implement a function of a core network user plane device in the method provided in the embodiments of this application.

The communications apparatus 1600 may further include a memory 1630 configured to store program instructions and/or data. The memory 1630 is coupled to the processor 1620. The processor 1620 may cooperate with the memory 1630. The processor 1620 may execute the program instructions stored in the memory 1630.

The communications apparatus 1600 may further include a transceiver 1610 (which may be replaced with a receiver and a transmitter, and the receiver implements a receiving function) configured to communicate with another device using a transmission medium, such that an apparatus in the communications apparatus 1600 may communicate with the other device. The processor 1620 sends and receives signaling through the transceiver 1610, and is configured to implement the method performed by the core network user plane device in the method embodiment of this application.

A specific connection medium between the transceiver 1610, the processor 1620, and the memory 1630 is not limited in this embodiment of this application. In this embodiment of this application, the memory 1630, the processor 1620, and the transceiver 1610 are connected using a bus 1640 in FIG. 15. The bus 1640 is represented using a thick line in FIG. 15. A manner of connecting other components is merely an example for description, and is not limited thereto. The bus 1640 may be classified into an address bus, a data bus, a control bus, and the like. For ease of representation, only one thick line is used to represent the bus 1640 in FIG. 15, but this does not mean that there is only one bus or only one type of bus.

Figure 16:
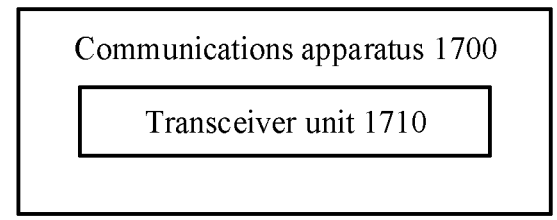
FIG. 16 is a schematic structural diagram of a communications apparatus according to still another embodiment of this application.

FIG. 16 is a schematic block diagram of a communications apparatus 1700 according to another embodiment of this application. It should be understood that the communications apparatus 1700 shown in FIG. 16 is merely an example. The communications apparatus 1700 in this embodiment of this application may further include other modules or units, may include modules having functions similar to those of modules in FIG. 16, or may not necessarily include all modules in FIG. 16. As shown in FIG. 16, the communications apparatus 1700 includes a transceiver unit 1710.

In some possible implementations, the communications apparatus 1700 may be an AUSF.

The transceiver unit 1710 is configured to receive a first service invocation request sent by a core access and mobility management function device, where the first service invocation request is used to request an authentication server function device (AUSF) to initiate an authentication result update.

The transceiver unit 1710 is further configured to send a second service invocation request to the unified data management device, where the second service invocation request is used to request to update an authentication result stored in the unified data management device.

In the foregoing technical solution, in a procedure after authentication is completed, an AMF sends the first service invocation request to the AUSF, and the AUSF sends the second service invocation request to the UDM, to indicate the UDM to remove or update the authentication result or mark the authentication result as invalid. In this way, the authentication result in a serving network can be removed or updated in a timely manner. This effectively prevents visited network spoofing and a DoS attack, and improves network security.

Optionally, the first service invocation request includes identity information of a serving network and identity information of a user.

The first service request includes the identity information of the serving network and the identity information of the user. After an authentication procedure is completed, the UDM stores information such as the identity information of the serving network, the identity information of the user, and the authentication result. When the authentication result needs to be updated, the AMF needs to send the identity information of the corresponding serving network and the identity information of the user to the AUSF. The serving network and the user for which the authentication result needs to be updated may be determined based on the identity information of the serving network and the identity information of the user.

For example, the first service request includes a serving PLMN ID and a SUPI. After the authentication procedure is completed, the UDM stores information such as the serving PLMN ID, the SUPI, and the authentication result. When the authentication result needs to be updated, the AMF needs to send the serving PLMN ID of the corresponding serving network and the SUPI to the AUSF. The serving network for which the authentication result needs to be updated may be determined based on the serving PLMN ID and the SUPI.

It should be understood that, in this embodiment of this application, the identity information of the serving network and the identity information of the user are not limited to the serving PLMN ID and the SUPI, provided that the serving network and the user can be uniquely identified.

Optionally, the first service invocation request may further include authentication result update identifier information, for example, false or other identifier information.

Optionally, the first service invocation request may further include timestamp information. The information is used for anti-replay, and is used by the UDM to record a time point at which the authentication result is updated.

Optionally, the second service invocation request includes the identity information of the serving network and the identity information of the user, and optionally includes authentication failure identifier information.

After receiving an authentication result update request sent by the AMF, the AUSF sends a second service invocation request to the UDM to invoke a service of the UDM. The second service invocation request is used to indicate the UDM to remove or update a stored authentication result, or mark an authentication result in a corresponding serving network as invalid. A service name is not limited in this embodiment of this application.

The second service request includes the identity information of the serving network and the identity information of the user. After the authentication procedure is completed, the UDM stores information such as the identity information of the serving network, the identity information of the user, and the authentication result. When the authentication result needs to be updated, the AMF or the AUSF needs to send the identity information of the corresponding serving network and the identity information of the user to the UDM. The serving network and the user for which the authentication result needs to be updated may be determined based on the identity information of the serving network and the identity information of the user.

For example, the second service invocation request includes the serving PLMN ID and the SUPI, and optionally includes an authentication result update identifier. The UDM searches, based on the serving PLMN ID and the SUPI that are included in the second service invocation request, the stored authentication result for the corresponding serving network and the user for which the authentication result needs to be updated, and updates the authentication result to failure, marks the authentication result in the corresponding serving network as invalid, or removes the authentication result.

Optionally, the second service invocation request may alternatively be an existing terminal device authentication result confirmation (Nudm_UEAuthentuication_Result Confirmation) service that is sent through a UDM interface.

The authentication result update identifier may be false or another value indicating failure. This is not limited in this embodiment of this application.

Optionally, the second service invocation request may further include timestamp information. The information is used for anti-replay, and is used by the UDM to record a time point at which the authentication result is updated.

Figure 17:
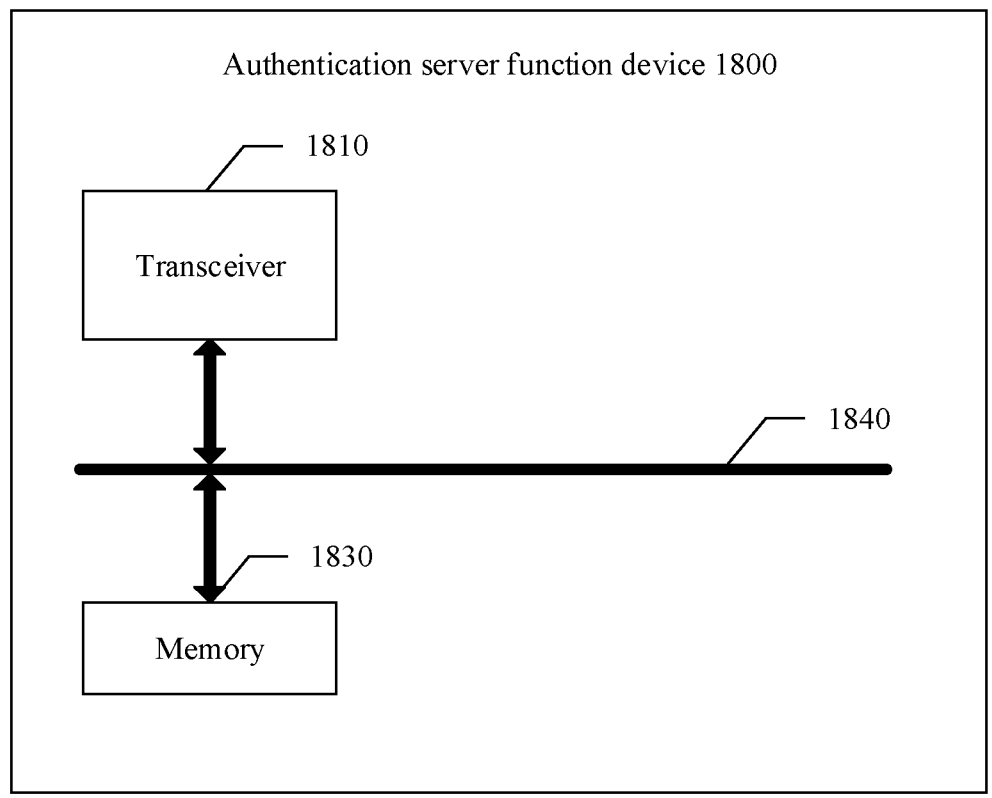
FIG. 17 is a schematic structural diagram of an authentication server function device according to still another embodiment of this application.

FIG. 17 shows a communications apparatus 1800 according to an embodiment of this application. The communications apparatus 1800 is configured to implement a function of an AUSF in the foregoing method. The communications apparatus 1800 may be a chip system. In this embodiment of this application, the chip system may include a chip, or may include a chip and another discrete component.

The communications apparatus 1800 may further include a memory 1830 configured to store program instructions and/or data.

The communications apparatus 1800 may further include a transceiver 1810 (which may be replaced with a receiver and a transmitter, and the receiver implements a receiving function) configured to communicate with another device using a transmission medium, such that an apparatus in the communications apparatus 1800 may communicate with the other device.

A specific connection medium between the transceiver 1810 and the memory 1830 is not limited in this embodiment of this application. In this embodiment of this application, in FIG. 17, the memory 1830 and the transceiver 1810 are connected using a bus 1840. The bus is represented by a thick line in FIG. 17. A manner of connecting other components is merely an example for description, and is not limited thereto. The bus may be classified into an address bus, a data bus, a control bus, and the like. For ease of representation, only one thick line is used to represent the bus in FIG. 17, but this does not mean that there is only one bus or only one type of bus.

Figure 18:
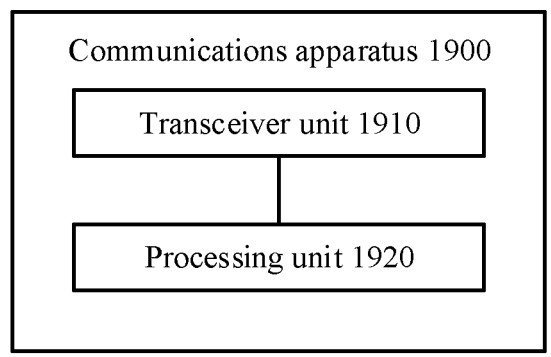
FIG. 18 is a schematic structural diagram of a communications apparatus according to yet another embodiment of this application.

FIG. 18 is a schematic block diagram of a communications apparatus 1900 according to another embodiment of this application. It should be understood that the communications apparatus 1900 shown in FIG. 18 is merely an example. The communications apparatus 1900 in this embodiment of this application may further include other modules or units, may include modules having functions similar to those of modules in FIG. 18, or may not necessarily include all modules in FIG. 18. As shown in FIG. 18, the communications apparatus 1900 includes a transceiver unit 1910 and a processing unit 1920.

In some possible implementations, the communications apparatus 1900 may be a UE.

The processing unit 1920 is configured to determine that an authentication result of a terminal device in a first serving network needs to be updated.

The transceiver unit 1910 is configured to send a first message to a core access and mobility management function device in the first serving network, where the first message is used to indicate to update the authentication result stored in a unified data management device.

In the foregoing technical solution, in some scenarios (for example, a de-registration scenario or an NAS SMC reject scenario) after an authentication procedure is completed, after determining that an authentication result of the terminal device in a public land mobile network PLMN needs to be updated, the terminal device sends the first message to the AMF, where the first message is used to indicate to update the authentication result stored in the UDM. In this way, visited network spoofing and a denial of service (DoS) attack are effectively prevented, and network security is improved.

Optionally, the transceiver unit 1910 is further configured to send a security mode reject message to the AMF.

After verification on an NAS SMC message fails, the UE sends the first message to the AMF, where the first message is the NAS security mode reject message.

Optionally, the security mode reject message includes authentication result update indication information, and the authentication result update indication information is used to indicate that the authentication result of the terminal device in the first serving network needs to be updated.

Optionally, after the verification on the NAS SMC message fails, the UE may further determine whether a currently rejected NAS connection is a last activated NAS connection. If the currently rejected NAS connection is the last activated NAS connection, the UE includes one piece of authentication result update indication information in the NAS security mode reject message, where the authentication result update indication information is used to indicate that the authentication result of the terminal device in the first serving network needs to be updated.

Alternatively, in some special scenarios (for example, the terminal device is powered off), it has been indicated that there is currently no signaling interaction or service data transmission between the UE and a network. Therefore, the UE may optionally directly include the authentication result update indication information in the first message to be sent to the AMF, without determining whether the currently rejected NAS connection is the last activated NAS connection. Then, the AMF updates the authentication result of the terminal device in the first serving network based on the authentication result update indication information.

Optionally, the transceiver unit 1910 is further configured to send a de-registration request message to the AMF.

After the UE initiates a de-registration procedure, the UE sends the first message to the AMF, where the first message is a de-registration request message, for example, a De-registration Request.

Optionally, the transceiver unit 1910 is further configured to receive a de-registration request message sent by the AMF.

When the AMF initiates explicit de-registration, the transceiver unit 1910 is further configured to receive a de-registration request message sent by the AMF.

Optionally, the transceiver unit 1910 is further configured to send a de-registration request message to the AMF, where the de-registration request message optionally includes authentication result update indication information, and the authentication result update indication information is used to indicate that the authentication result of the terminal device in the first serving network needs to be updated.

Optionally, when initiating the de-registration procedure, the UE may further determine whether an NAS connection from which the UE currently requests to de-register is a last activated NAS connection. If the NAS connection from which the UE currently requests to de-register is the last activated NAS connection, in S505, the de-registration request message sent by the UE to the AMF carries the authentication result update indication information. The authentication result update indication information is used to indicate that the authentication result of the terminal device in the first serving network needs to be updated.

Alternatively, in some special scenarios (for example, the terminal device is powered off), it has been indicated that there is currently no signaling interaction or service data transmission between the UE and a network. Therefore, the UE may optionally directly include the authentication result update indication information in the first message to be sent to the AMF, without determining whether the NAS connection from which the UE currently requests to de-register is the last activated NAS connection. Then, the AMF updates the authentication result of the terminal device in the first serving network based on the authentication result update indication information.

Figure 19:
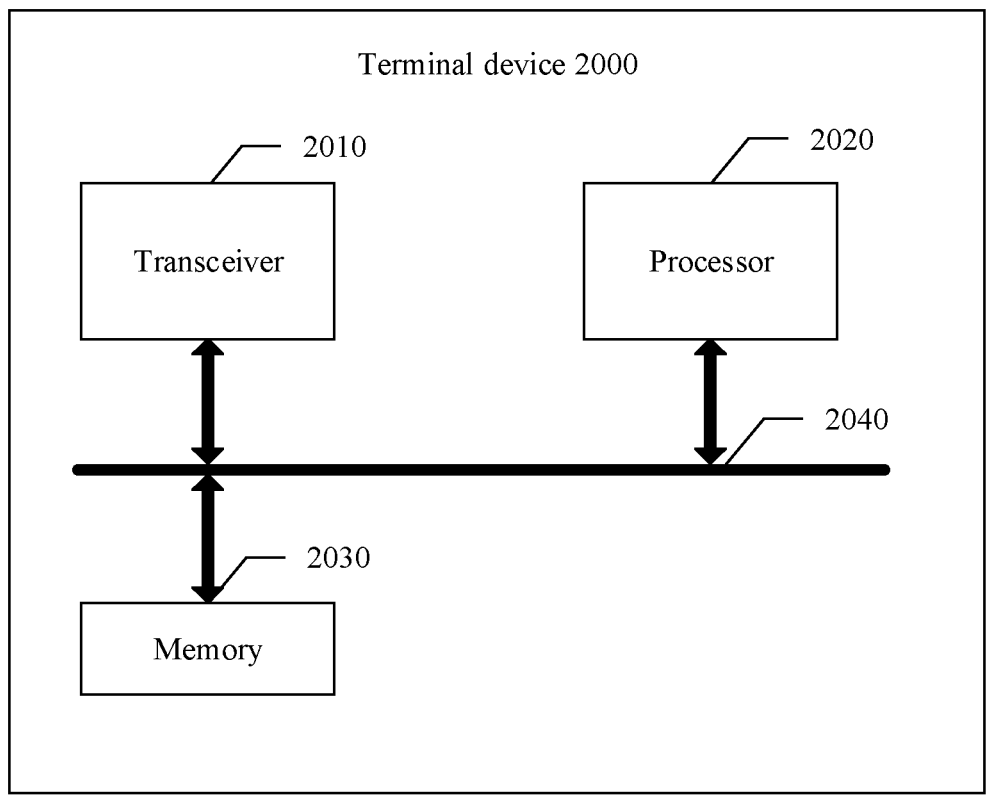
FIG. 19 is a schematic structural diagram of a terminal device according to yet another embodiment of this application.

FIG. 19 shows a communications apparatus 2000 according to an embodiment of this application. The communications apparatus 2000 is configured to implement a function of a terminal device in the foregoing method. The communications apparatus 2000 may be a chip system. In this embodiment of this application, the chip system may include a chip, or may include a chip and another discrete component. The communications apparatus 2000 includes a processor 2020 configured to implement a function of the terminal device in the method provided in the embodiments of this application.

The communications apparatus 2000 may further include a memory 2030 configured to store program instructions and/or data. The memory 2030 is coupled to the processor 2020. The processor 2020 may cooperate with the memory 2030. The processor 2020 may execute the program instructions stored in the memory 2030.

The communications apparatus 2000 may further include a transceiver 2010 (which may be replaced with a receiver and a transmitter, and the receiver implements a receiving function) configured to communicate with another device using a transmission medium, such that an apparatus in the communications apparatus 2000 may communicate with the other device. The processor 2020 sends and receives signaling through the transceiver 2010, and is configured to implement the method performed by a core network user plane device in the method embodiment of this application.

A specific connection medium between the transceiver 2010, the processor 2020, and the memory 2030 is not limited in this embodiment of this application. In this embodiment of this application, the memory 2030, the processor 2020, and the transceiver 2010 are connected using a bus 2040 in FIG. 19. The bus 2040 is represented using a thick line in FIG. 19. A manner of connecting other components is merely an example for description, and is not limited thereto. The bus 2040 may be classified into an address bus, a data bus, a control bus, and the like. For ease of representation, only one thick line is used to represent the bus 2040 in FIG. 19, but this does not mean that there is only one bus or only one type of bus.

An embodiment of this application further provides a communications system, including the foregoing network device and one or more terminal devices.

This application further provides a computer-readable storage medium. The computer-readable storage medium stores instructions. When the instructions are run on a computer, the computer is enabled to perform the steps performed by the AMF in the methods shown in FIG. 2 to FIG. 11B.

This application further provides a computer-readable storage medium. The computer-readable storage medium stores instructions. When the instructions are run on a computer, the computer is enabled to perform the steps performed by the UDM in the methods shown in FIG. 2 to FIG. 11B.

This application further provides a computer program product including instructions. When the computer program product runs on a computer, the computer is enabled to perform the steps performed by the AUSF in the methods shown in FIG. 2 to FIG. 11B.

This application further provides a computer program product including instructions. When the computer program product runs on a computer, the computer is enabled to perform the steps performed by the UE in the methods shown in FIG. 2 to FIG. 11B.

This application further provides a chip, including a processor. The processor is configured to read a computer program stored in a memory and run the computer program, to perform a corresponding operation and/or procedure performed by the AMF in the communication method provided in this application. Optionally, the chip further includes a memory. The memory and the processor are connected using a circuit or a wire. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application further provides a chip, including a processor. The processor is configured to invoke a computer program stored in a memory and run the computer program, to perform a corresponding operation and/or procedure performed by the UDM in the communication method provided in this application. Optionally, the chip further includes a memory. The memory and the processor are connected using a circuit or a wire. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application further provides a chip, including a processor. The processor is configured to invoke a computer program stored in a memory and run the computer program, to perform a corresponding operation and/or procedure performed by the AUSF in the communication method provided in this application. Optionally, the chip further includes a memory. The memory and the processor are connected using a circuit or a wire. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application further provides a chip, including a processor. The processor is configured to invoke a computer program stored in a memory and run the computer program, to perform a corresponding operation and/or procedure performed by the UE in the communication method provided in this application. Optionally, the chip further includes a memory. The memory and the processor are connected using a circuit or a wire. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, a digital-to-analog converter, or the like. The processor may allocate control and signal processing functions of a terminal device or a network device to the devices based on respective functions of the devices. In addition, the processor may have a function of operating one or more software programs, and the software program may be stored in a memory. The function of the processor may be implemented by hardware, or may be implemented by hardware by executing corresponding software. The hardware or the software includes one or more modules corresponding to the foregoing function.

The memory may be a read-only memory (ROM), another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, any other medium that can be used to carry or store expected program code in a form of an instruction or a data structure and that can be accessed by a computer, or the like.

Optionally, the memory and the memory may be physically independent units, or the memory may be integrated with the processor.

In the embodiments of this application, the term "at least one" means one or more, and the term "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural. The character "/" usually indicates an "or" relationship between the associated objects. The term "at least one item of the following" or a similar expression thereof means any combination of the items, including any combination of singular items or plural items. For example, at least one of a, b, and c may indicate a, b, c, a and b, a and c, b and c, or a, b, and c, where a, b, and c may be singular or plural.

A person of ordinary skill in the art may be aware that units, algorithms, and steps described in the embodiments disclosed in this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the foregoing method embodiments.

In the several embodiments provided in this application, the disclosed system, apparatus and method may be implemented in another manner. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in an electrical form, a mechanical form, or another form.

The units described as separate parts may not be physically separate, and parts displayed as units may not be physical units, and may be located in one position, or may be distributed on a plurality of network units. Some or all of the units may be selected based on an actual requirement to achieve the objectives of the technical solutions of this application.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a universal serial bus (USB) flash drive, a removable hard disk drive, a ROM, a RAM, a magnetic disk, or an optical disc.

The foregoing descriptions are merely example implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method, comprising:
   determining, by an access and mobility management function device, that an authentication result of a terminal device needs to be removed, wherein the authentication result is a result of authentication of the terminal device from an authentication server; and
   sending, by the access and mobility management function device, a request to the authentication server, wherein the request requests the authentication server to inform a unified data management device, which is configured to receive the authentication result from the authentication server and store the authentication result, to remove the authentication result that is stored in the unified data management device.

2. The method of claim 1, wherein determining that the authentication result of the terminal device needs to be removed comprises determining, by the access and mobility management function device, that the authentication result of the terminal device needs to be removed in a non-access stratum (NAS) security mode command (SMC) reject scenario.

3. The method of claim 2, wherein determining, by the access and mobility management function device, that the authentication result of the terminal device needs to be removed in the NAS SMC reject scenario comprises determining, by the access and mobility management function device, that the authentication result of the terminal device needs to be removed when receiving a security mode reject message from the terminal device.

4. The method of claim 1, wherein determining that the authentication result of the terminal device needs to be removed comprises determining, by the access and mobility management function device, that the authentication result of the terminal device needs to be removed in a terminal device de-registration scenario.

5. The method of claim 4, wherein determining, by the access and mobility management function device, that the authentication result of the terminal device needs to be removed in the terminal device de-registration scenario comprises:
   determining, by the access and mobility management function device, that the authentication result of the terminal device needs to be removed when receiving a de-registration request message from the terminal device; or
   determining, by the access and mobility management function device, that the authentication result of the terminal device needs to be removed when the access and mobility management function device initiates a de-registration procedure.

6. The method of claim 1, wherein the request comprises identity information for uniquely identifying a serving network and the terminal device.

7. A method, comprising:
   receiving, by a unified data management device, an authentication result from an authentication server, wherein the authentication result is a result of authentication of a terminal device;
   receiving, by the unified data management device configured to store the authentication result, a request from the authentication server, wherein the request requests to remove the authentication result stored in the unified data management device; and
   removing, by the unified data management device based on the request, the authentication result stored in the unified data management device.

8. The method of claim 7, wherein the request comprises identity information of a serving network and subscription permanent identifier (SUPI).

9. The method of claim 7, wherein before receiving the request, the method further comprises:
   receiving, by the unified data management device, an authentication result confirmation request from the authentication server; and sending, by the unified data management device, an authentication result confirmation response to the authentication server, wherein the authentication result confirmation response indicates a status of storing the authentication result in the unified data management device.

10. An apparatus, comprising:

one or more processors; and a memory coupled to the one or more processors and configured to store executable instructions for execution by the one or more processors to instruct the one or more processors to:

determine that an authentication result of a terminal device needs to be removed, wherein the authentication result is a result of authentication of the terminal device from an authentication server; and send a request to the authentication server, wherein the request requests the authentication server to inform a unified data management device, which is configured to receive the authentication result from the authentication server and store the authentication result, to remove the authentication result that is stored in the unified data management device.

11. The apparatus of claim 10, wherein the executable instructions further instruct the one or more processors to determine that the authentication result of the terminal device needs to be removed in a non-access stratum (NAS) security mode command (SMC) reject scenario.

12. The apparatus of claim 11, wherein the executable instructions further instruct the one or more processors to determine that the authentication result of the terminal device needs to be removed when receiving a security mode reject message from the terminal device.

13. The apparatus of claim 10, wherein the executable instructions further instruct the one or more processors to determine that the authentication result of the terminal device needs to be removed in a terminal device de-registration scenario.

14. The apparatus of claim 13, wherein the executable instructions further instruct the one or more processors to:

determine that the authentication result of the terminal device needs to be removed when the apparatus receives a de-registration request message from the terminal device; or determine that the authentication result of the terminal device needs to be removed when the apparatus initiates a de-registration procedure.

15. The apparatus of claim 10, wherein the request comprises identity information for uniquely identifying a serving network and the terminal device.

16. An apparatus, comprising:

one or more processors; and a memory coupled to the one or more processors and configured to store executable instructions for execution by the one or more processors to instruct the one or more processors to:

receive an authentication result from an authentication server, wherein the authentication result is a result of authentication of a terminal device;

store the authentication result;

receive a request from the authentication server, wherein the request requests to remove the authentication result stored in the apparatus; and remove the authentication result stored in the apparatus based on the request.

17. The apparatus of claim 16, wherein the request comprises identity information of a serving network and subscription permanent identifier (SUPI).

18. The apparatus of claim 16, wherein the executable instructions further instruct the one or more processors to:

receive an authentication result confirmation request from the authentication server; and send an authentication result confirmation response to the authentication server, wherein the authentication result confirmation response indicates a status of storing the authentication result in the apparatus, and wherein the apparatus is a unified data management device.

* * * * *